United States Patent [19]

Cress et al.

[11] 4,306,849
[45] Dec. 22, 1981

[54] APPARATUS FOR PROVIDING BOTTOM BLANKS FOR CONTAINERS IN A MANUFACTURING PROCESS

[75] Inventors: Allan K. Cress, Baltimore; Charles E. Busse, Jarrettsville, both of Md.

[73] Assignee: Maryland Cup Corporation, Owings Mills, Md.

[21] Appl. No.: 953,620

[22] Filed: Oct. 23, 1978

Related U.S. Application Data

[63] Continuation-in-part of Ser. No. 665,617, Mar. 10, 1976, Pat. No. 4,121,402.

[51] Int. Cl.³ .................... B26D 7/06; B29C 17/08; B32B 1/04; B32B 1/16
[52] U.S. Cl. .................... 425/305.1; 83/99; 83/100; 83/110; 83/152; 156/517; 156/521; 425/504; 425/508; 425/512; 493/67; 493/108
[58] Field of Search .............. 93/1.3, 36 B, 55.1 R; 83/110, 152, 98, 99, 100; 425/305.1, 501, 504, 512, 508; 264/153; 156/517, 521; 198/461; 493/67, 104, 105, 106, 108

[56] References Cited

U.S. PATENT DOCUMENTS

| | | | |
|---|---|---|---|
| 972,767 | 10/1910 | Jenkins | 93/55.1 R |
| 3,104,752 | 9/1963 | Rudszinat et al. | 198/461 X |
| 3,159,521 | 12/1964 | Pechmann | 83/110 X |
| 3,174,372 | 3/1965 | Huck | 83/110 |
| 3,611,855 | 10/1971 | Thousand, Jr. | 83/152 X |
| 3,969,173 | 7/1976 | Amberg et al. | 264/160 X |
| 3,983,207 | 9/1976 | Sinnema | 198/461 X |
| 4,083,277 | 4/1978 | Lotz | 83/110 X |

Primary Examiner—Jan H. Silbaugh
Attorney, Agent, or Firm—Birch, Stewart, Kolasch & Birch

[57] ABSTRACT

The present invention is directed to an apparatus and method wherein bottom blanks for containers are severed from a web feed roll and subsequently transferred at a compatible speed and spacing to final forming mandrels on which finished containers are to be formed. The bottom blanks are tangentially transferred from a first transfer turret at a final velocity and spacing most desirable for cutting and minimizing scrap to a second transfer turret at a second velocity and spacing and thereafter tangentially transferred to the final forming mandrels. Subsequently, preprinted rectangular blanks of longitudinally stretch-oriented foam sheet material formed into cylinders are transferred onto the final forming mandrels. Thereafter, the bottom blanks the cylindrical blanks and the final forming mandrels are heated to shrink the cylindrical blanks so that they assume the shape of the final forming mandrels. The top curl on containers such as drinking cups and food tubs is formed after shrink forming. Further, the bottom seam of the container is reinforced by ironing after shrink forming.

49 Claims, 27 Drawing Figures

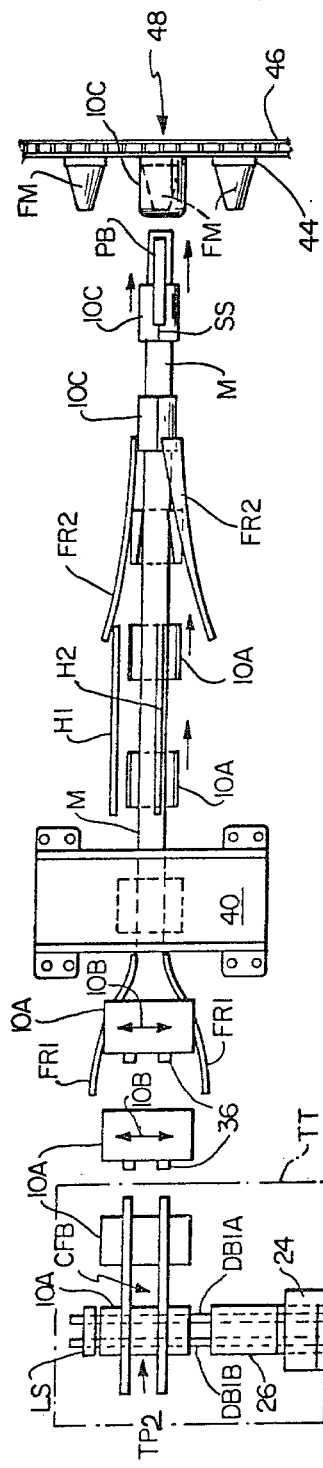
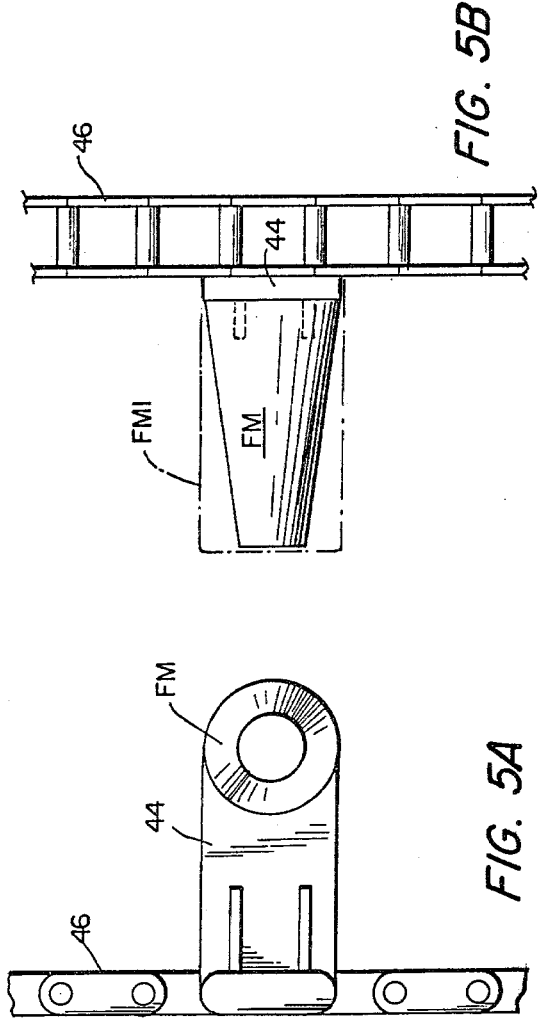
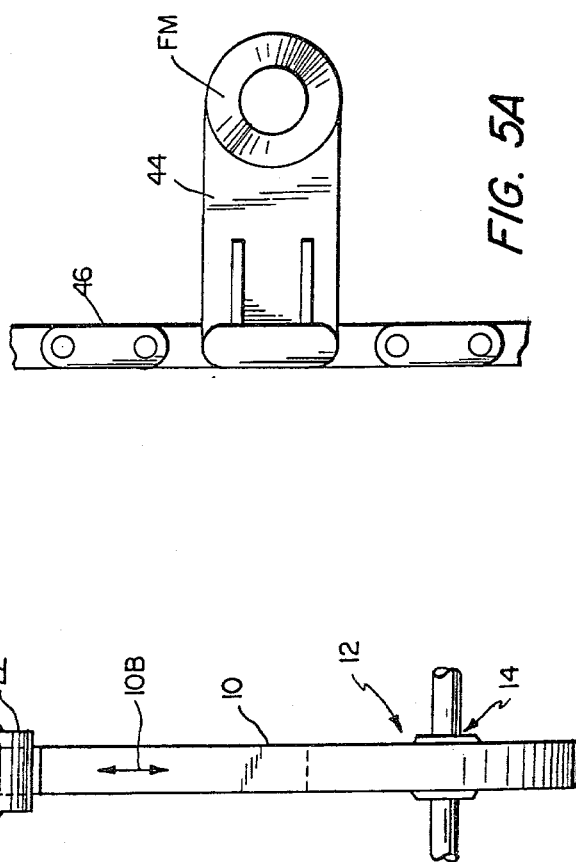
FIG. 1
FIG. 5A
FIG. 5B

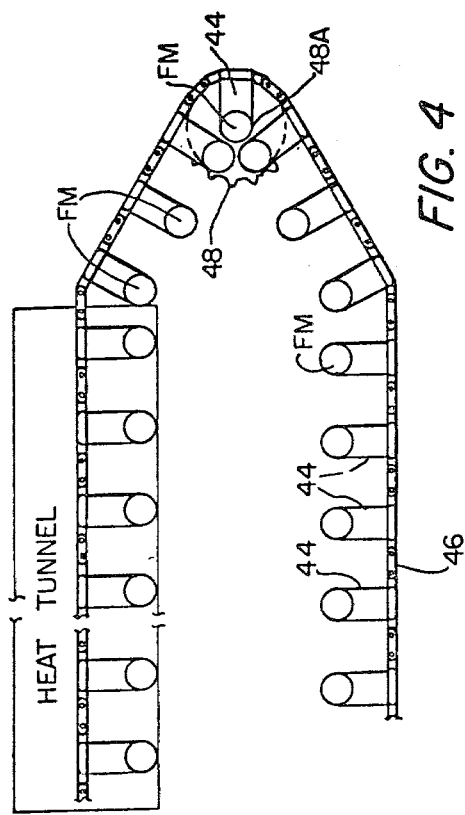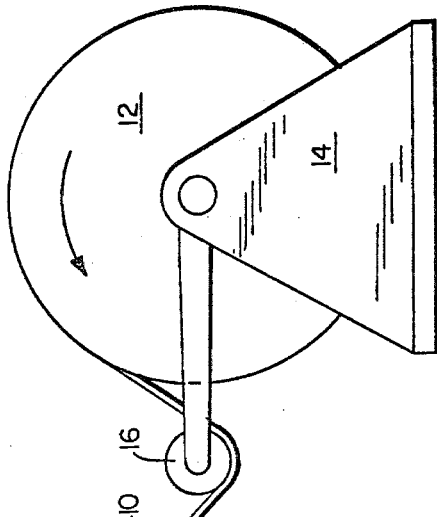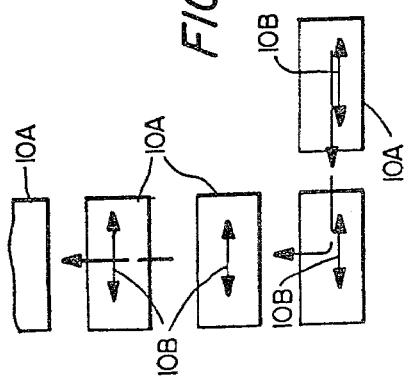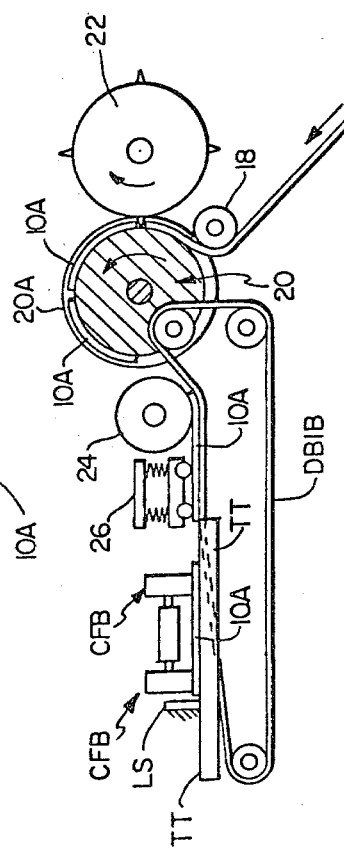

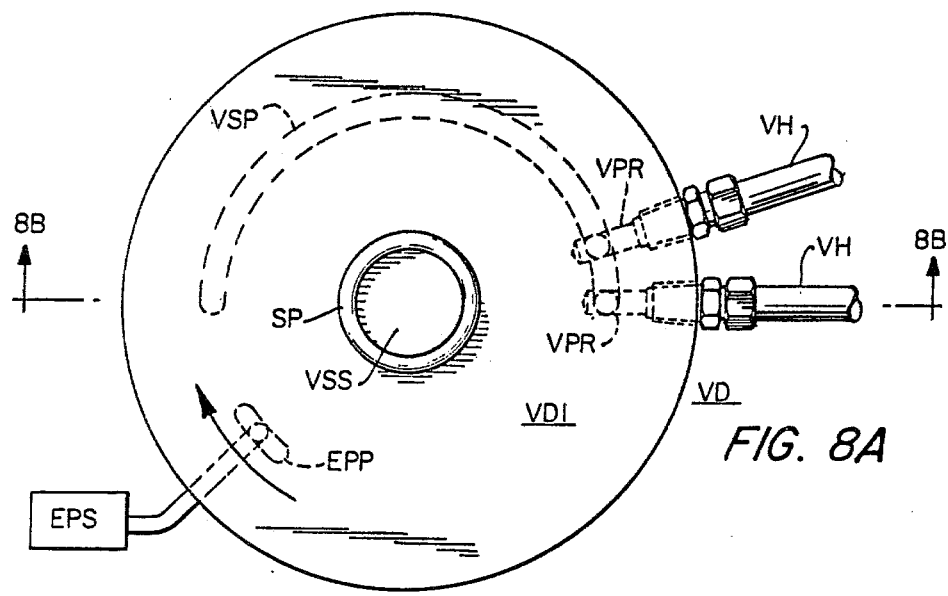
FIG. 8A
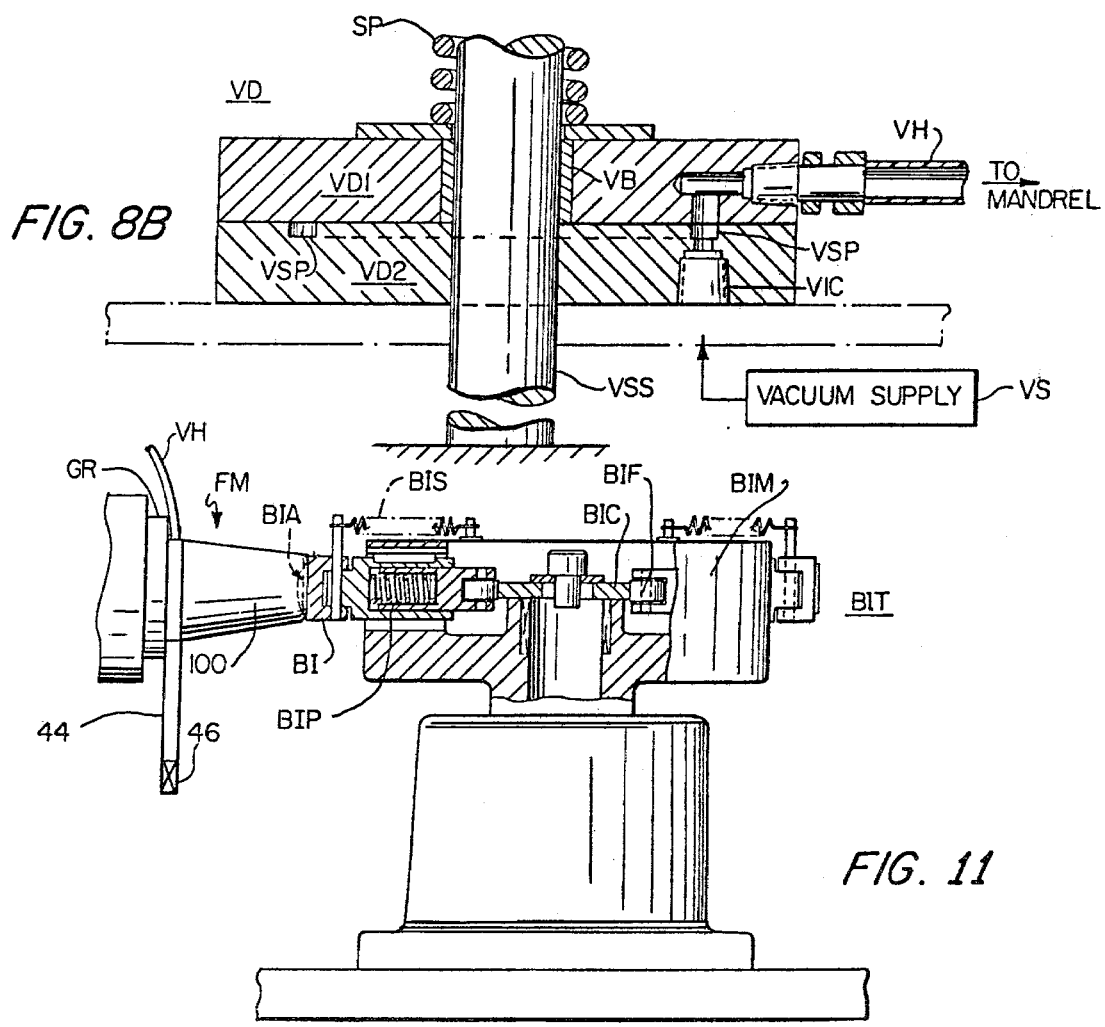
FIG. 8B
FIG. 11

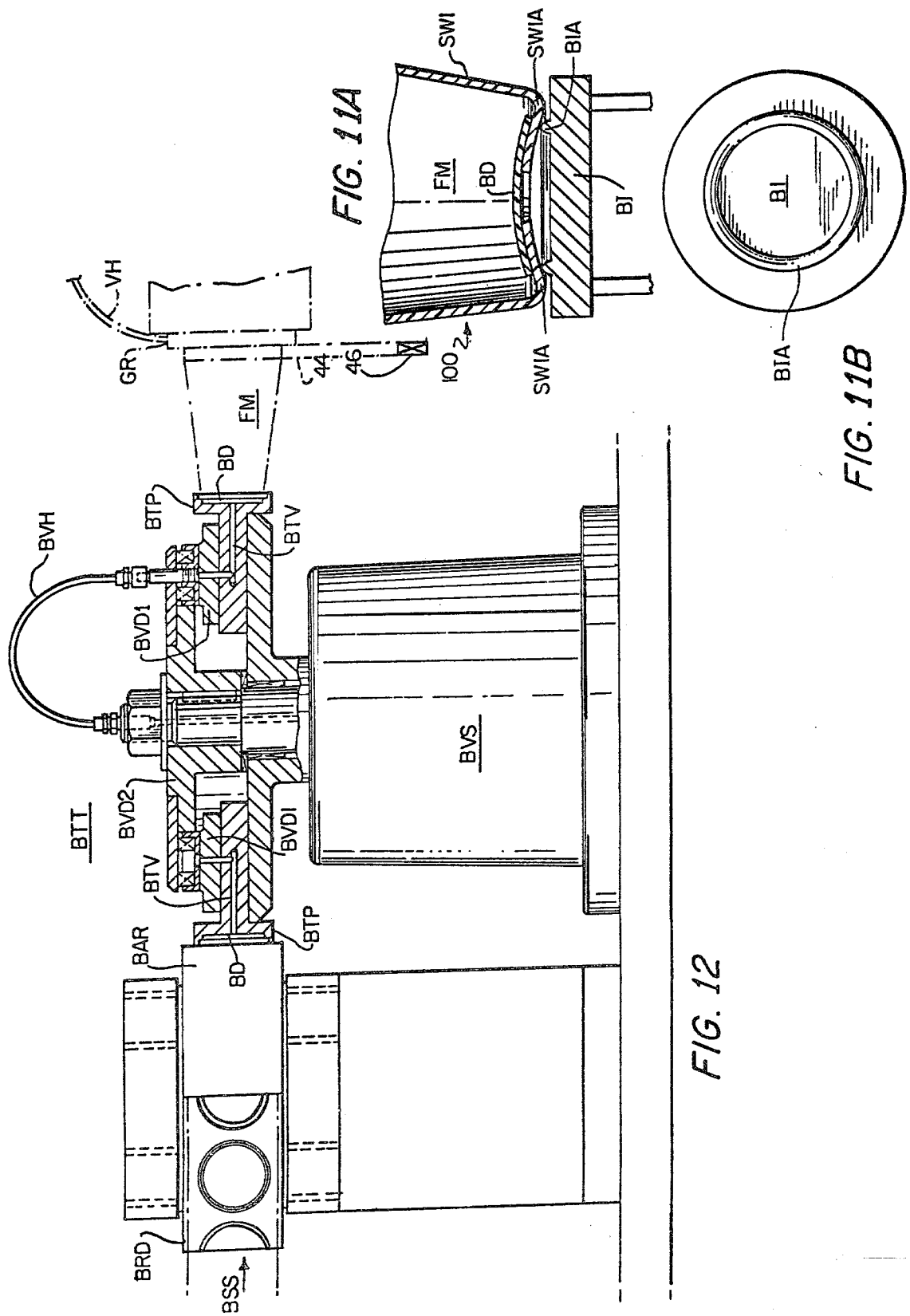

APPARATUS FOR PROVIDING BOTTOM BLANKS FOR CONTAINERS IN A MANUFACTURING PROCESS

CROSS-REFERENCE TO RELATED APPLICATIONS

This invention is a Continuation-In-Part of the inventor's copending application Ser. No. 665,617, filed Mar. 10, 1976, now U.S. Pat. No. 4,121,402.

FIELD OF THE INVENTION

This invention relates to a method and apparatus for severing bottom blanks from a web feed roll and transferring this blank into position on transitory forming mandrels in a continuous and uninterrupted manner. This invention relates more particularly to a method and apparatus for severing bottom blanks, positioning the bottom blanks on final forming mandrels, positioning cylindrical blanks on said final forming mandrels and thereafter heating the assembly to form a container while continuously moving said final forming mandrels.

BACKGROUND OF THE INVENTION

It is extremely important in the manufacturing of disposable containers to maximize use of the container material. The bottom of a container is usually severed from a continuous web, thus incurring waste in the area of the continuous web between the severed blanks.

To maximizing the use of the container material it is extremely essential that the bottom blanks be severed in close proximity to each other along the length of the continuous bottom blank web. Further, the cylindrical blanks which define the side walls of the container must also be severed from a second supply of material in such a manner to maximize use of the container material.

Apparatus for cutting and transferring bottom blanks from a continuous web should continuously transfer the severed bottom blank to the final forming mandrel or other work station at which the blank is to be utilized and at the same time minimize the waste of the bottom blank material web. Final forming mandrels utilized in the construction of disposable cups, for example, may be positioned along an endless chain and spaced from each other by a substantial distance. To minimize the waste of the bottom blank material web it is essential that the bottom blanks be severed in close proximity to each other. This gives rise to incompatible parameters, namely, a minimum spacing at the cutting station and a maximum spacing at the work station. As a consequence, there is a velocity disparity as well in a continuous feeding and forming process between web velocity at the cutter and the velocity of the transitory mandrels or other bottom blank receiving means at the work station at the point of transfer.

Further, it is known in the art to shrink form containers such as drinking cups from preformed tubular lengths of circumferentially oriented thermoplastic material such as foamed polystyrene.

One particularly desirable method of initially forming a tubular length of such circumferentially oriented material is to provide rectangular-preprinted blanks and wrap these blanks around a mandrel whereon a heat sealed seam is effected longitudinally along the circumference of the formed tubular length. The use of rectangular blanks facilitates pre-printing of patterns, designs, logos, etc., on the blanks such that the ultimate tubular lengths and containers formed therefrom will bear the ultimately desired indicia.

A further advantage of the rectangular blank is that it may be cut from an extruded sheet of thermoplastic or thermoplastic foam which is streched longitudinally, i.e., in the most logical, natural and facile direction of stretch after extrusion, namely, the machine direction, to achieve the necessary circumferential orientation in a tubular length or cylinder formed from the rectangular blank.

Previous efforts to handle these rectangular blanks and form them into cylinders, however, have required relatively elaborate systems of transfer rollers, turrets with multiple mandrels thereon and vacuum systems to properly index leading and/or trailing edges of the rectangular blanks on the transfer rollers or mandrels.

OBJECTS OF THE INVENTION

It is an object of the present invention to provide a new and novel apparatus and method wherein bottom blanks for containers are severed from a web feed roll in close proximity to each other and interfaced with a work station requiring a substantially increased spacing therebetween in a continuous manner.

A further object of the present invention is to provide a new and novel an apparatus and method of minimizing the waste which occurs when bottom blanks are severed from a web feed roll while compatibly interfacing the blanks so formed into a manufacturing process.

A further object of the present invention is to provide a new and novel method and apparatus for manufacturing cylinders and shrink-formed containers from rectangular blanks of hear shrinkable plastic material such as foamed polystyrene.

Another object of the present invention is to provide a new and novel method and apparatus for continously producing shrinkable cylinders from rectangular blanks without the use of multiple mandrels or vacuum handling means for the rectangular blanks.

These and other objects of the present invention will become more fully apparent with reference to the following specification and drawings which relate to preferred embodiments of the present invention.

SUMMARY OF THE INVENTION

The present invention is directed to an apparatus and method for providing bottom blanks severed from a web feed roll in a compatible interface with a continuous manufacturing process with a minimum amount of waste. The web feed roll is fed between a cutter drum and a first transfer turret so as to effect the severing of the bottom blanks from the web feed roll at a first velocity and spacing on said first turret. Thereafter, the first transfer turret transports the severed bottom blanks to a point where they are tangentially transferred to a second transfer turret at which point they are constrained to assume a second velocity and spacing compatible with the velocity and spacing of final container forming mandrels translating past the second transfer turret in the said continous process. The bottom blanks are then tangentially transferred to final forming mandrels. The diameter of the cutter drum is approximately one-half the diameter of the first transfer turret and approximately one-fourth the diameter of the second transfer turret, respectively, in a preferred embodiment of the invention. Therefore, the bottom blanks which are cut from the web feed roll are severed at a relatively high speed and in close proximity to each other because of the small diameter of the cutter drum and the close positioning of the cutter dies positioned around the circumference of the cutter drum while the blanks are delivered at a lower speed and wider spacing from the second transfer to the final forming mandrels.

The bottom blank apparatus of the present invention is used in combination with a cylinder forming apparatus. A convolute roll of elongated preprinted stock of longitudinally oriented heat shrinkable material such as polystyrene foam is unwound to feed the stock to a rotary cutter which severs the feed stock into rectangular blanks of substantially identical dimensions. The cut blanks are fed by feed belts on their longitudinal axes and subsequently fed on their transverse axes by means of pusher dogs through a progressive series of forming rails adjacent a single elongated tubular forming mandrel until a tubular length or cylinder having a lapped side seam is formed about the tubular forming mandrel by each blank. In a first embodiment, a pressure belt may effect a sealed side seam and discharge the cylinder from the tubular forming mandrel onto a final forming mandrel having a bottom blank positioned thereon. The final forming mandrel is in coaxial registry with the tubular forming mandrel and formed cylinder during the discharge of each cylinder from the tubular forming mandrel.

The final forming mandrels have bottom and sidewall defining portions and are shaped in cross section like a desired ultimate container such as cylindrical food can with a rounded bottom edge or a frusto-conical drinking cup. As stated above, a bottom blank may be placed on the final forming mandrels and held there by vacuum while the sidewall of the ultimate container, namely, the tubular length or cylinder is transferred from the initial forming mandrel onto the final forming mandrel.

Once both components of the basic container or cup are on a given final forming mandrel, each such final forming mandrel is constrained out of registry with the tubular forming mandrel and translated through a heat tunnel to shrink the cylinder or tubular length into conformity with the sidewall slope of the final forming mandrel to provide the desired container shape.

In all cases in the preferred embodiments of the present invention, the cylinders exceed the axial length of the final forming mandrels such that the bottom edge of the sidewall shrinks around the outer edges of the bottom blank to provide a heat sealable bottom seam. The final heat sealing is effected by any suitable heating means such as conformally shaped contact heater.

Where a cup-shaped (frusto-conical) container is desired, a final step in the process is the forming of a top curl or bead to increase the lateral stiffness of the container and ensure drinking comfort. In the case of food container of a more conventional substantially cylindrical shape, the steps of filling and closing by the application of a suitable lid or closure represent the final steps.

Therefore, the present invention clearly contemplates and provides for the in-line manufacture of containers from heat shrinkable plastic in a food packing line of the type wherein metered charges of food, etc., are placed and sealed within a succession of containers presented at a filling station.

Therefore, in food processing plants where food containers for coleslaw, pickled vegetables, potato salad, cottage cheese and other products not pressure packed, no large storage area for containers would be necessary with the present invention.

Instead, rolls of material for a large number of materials could be stored in much less space than that required for containers. Furthermore, since the containers would be made as they are used, the problems of inventories and supply of previously manufactured containers would be substantially obviated.

Further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a top plan view of a blank handling cylinder forming and cylinder transferring mechanism of the present invention;

FIG. 2 is a side elevation of the feed roll, rotary cutter and right angle transfer belts of the present invention;

FIG. 2A is a top plan schematic illustrating the stretch orientation of cut rectangular blanks as they undergo the right angle transfer from the rotary cutter to the cylinder forming means of the present invention;

FIG. 4 is a schematic side elevation of a forming mandrel drive, transfer station and forming oven of the present invention;

FIG. 5A is a detail of a forming mandrel, mount and drive chain in side elevation;

FIG. 5B is a top elevation of the detail of FIG. 5A with an alternate form of forming mandrel shown in dotted lines therein;

FIG. 8A is a top view of a vacuum distributor of the present invention;

FIG. 8B is a side elevation in cross section of the vacuum distributor of FIG. 8A taken along line 8B—8B of FIG. 8A;

FIG. 11 is a cross section of the bottom finishing station taken along line 11—11 of FIG. 9;

FIG. 11A is an enlarged cross-sectional illustration of a bottom iron engaging a container bottom on a mandrel of the present invention during bottom sealing;

FIG. 11B is a top plan view of the bottom iron of FIGS. 9, 10, 11 and 11A;

FIG. 12 is a cross section taken along line 12—12 of FIG. 9;

DETAILED DESCRIPTION OF THE DRAWINGS

Figure 3:
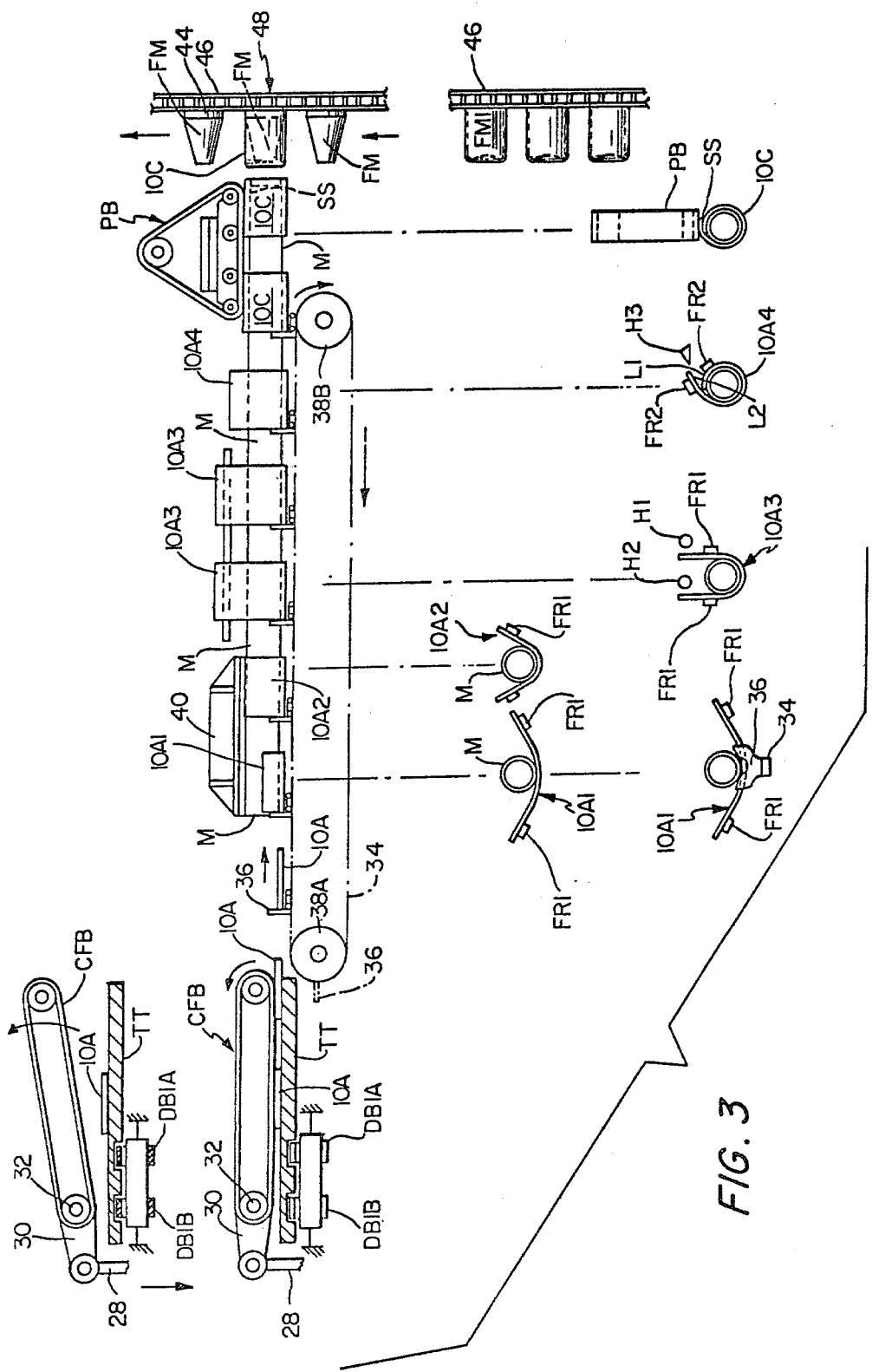
FIG. 3 is an exploded schematic illustrating in correlated cross section the various forming stages of the present invention in converting a rectangular blank into a cylinder by continuous movement of the blank along a fixed mandrel.

Referring to FIGS. 1 and 2 the material 10 from which the intermediate cylinders and ultimate containers are to be made is shown as an elongated strip convolutely wound in the form of a large supply roll 12 rotatably mounted on a suitable stanchion or support 14.

The feed material 10 is unwound from the supply roll 12 and passed beneath a tension roller 16 (FIG. 2) and a guide roller 18 into contact with a vacuum feed drum 20 which cooperates with a synchronized rotary cutter means 22 to sever the end of the feed material 10 into uniform rectangular blanks 10A.

The feed material 10 is stretch oriented for enhanced heat shrink characteristics in the direction 10B which is parallel to the long dimension of the ultimate rectangular blanks 10A.

As the blanks 10A are released from the downstream side of the vacuum drum 20, the latter being flanged at 20A, 20B to contain the narrower width of the feed material 10 between the flanges 20A, 20B as shown in FIGS. 1 and 2, an upper pinch roll 24 and blank bottom engaging pair of drive belts DB1A and DB1B entrain the leading edge of each successive blank 10A. Each blank 10A is fed on its longitudinal axis by the drive belts DB1A, DB1B beneath a biased retaining guide 26 to a right angle transfer point TP2.

At the transfer point TP2 a set of cross-feed belts CFB are located adjacent a limit stop means LS which abuts with and positions each rectangular blank 10A for lateral transfer by the said cross-feed belts CFB.

The drive belts DB1A and DB1B pass at an angle through suitable slots in the surface of a transfer table TT such that prior to engaging the limit stop LS the blanks 10A have been accelerated by and broken contact with the drive belts DB1A and DB1B.

As shown in FIG. 3, the cross-feed belts CFB are mounted to pivot toward and away from the upper surface of the transfer table TT in synchronism with the forming of the rectangular blanks 10A and their delivery to the transfer point TP2. Thus, each said blank 10A will be transferred laterally of its longitudinal axis substantially instantaneously upon engaging the limit stop LS at the transfer point TP2.

The pivotal motion of the cross-feed belt assembly CFB is effected by means of a drag link 28 and crank arm 30 acting about a pivot point 32 as illustrated in FIG. 3.

The cross-feed belts CFB drive the blanks 10A off the transfer table TT onto a carrier chain 34 having pushers or dogs 36 thereon which engage the trailing edges of the blanks 10A and propel them along in a direction transverse to their longitudinal stretch orientation direction 10B.

Longitudinally disposed along the upper reach of the carrier chains 34 is a hollow tubular forming mandrel M which is fixed against rotation in a suitable holding bracket 40.

Leading into the bracket 40 and progressively varying in shape along the substantially entire extent of the forming mandrel M are opposed forming rails FR1, the extent of which can best be understood with reference to FIGS. 1 and 3.

As the carrier chain 34 progresses clockwise around the chain drive sprockets 38A, 38B, the pusher dogs 36 move the blanks 10A through the forming rails FR1 to bend the blanks 10A in stages 10A1 into a U-shape 10A3 about the mandrel M with the legs of the U-shaped blank 10A3 being adjacent to elongated external and internal surface heaters H1 and H2, respectively, the "external" surface being the outer surface of the innermost lap L1 of a side seam and the "internal" surface being the inner surface of the outer lap L2 of the side seam as shown in the substantially cylindrical fold 10A4 of the blank 10A effected by means of folding rails FR2 downstream from the heaters H1, H2.

A heater H3, schematically shown in FIG. 3 can be utilized to provide additional heat such as radiation or force hot air between the nearly juxtaposed laps L1 and L2.

When the cylindrical fold is completed the rectangular blank 10A has been converted into a cylinder 10C which exists the folding rails FR2 and passes under a pressure belt assembly PB which applies sufficient downward pressure on the laps L1-L2 to form a heat-sealed lapped side seam SS in the cylinder 10c while at the same time translating the cylinder 10C off the mandrel M and onto a finishing mandrel FM.

Referring to FIGS. 3, 5A and 5B, the finishing mandrels FM are shown in solid lines as having a frusto-conical (drinking-cup) shape and in dotted lines as having a substantially cylindrical shape FM1 similar to that of pressurized aluminum beverage cans.

The finishing mandrels FM are mounted on one end of support arms 44 which are mounted at their other ends on a drive chain 46 which passes about a main transfer sprocket 48 adjacent the finish end of the elongated forming mandrel M. As shown in FIGS. 1 and 3, the finished cylinders 10C are stripped from the forming mandrel M onto one of the finishing mandrels FM which is in substantially coaxial registry with the forming mandrel M.

This registry is achieved by proportioning the transfer sprocket 48 such that the arms 44 are radii thereof and place the finishing mandrels FM one-by-one at the dead center position 48A of the transfer sprocket 48 at the point of coaxial registry with the forming mandrel M. As a result, a time delay during which the finishing mandrel FM remains in such registry is effected, thereby permitting transfer of the cylinder 10C from the forming mandrel M onto the finishing mandrel FM. In another embodiment the registry of the finishing mandrel may be effected by synchronization of the discharge of the cylinder 10C from the forming mandrel M onto the finishing mandrel FM.

Once the cylinders are transferred onto the finishing mandrels FM they are conveyed on those mandrels through a suitable heat tunnel HT, the length of the latter and its temperature being correlated with the speed of the carrier chain 46 to shrink the cylinders to a frusto-conical configuration or a cylindrical configuration depending upon the shape of the finishing mandrel FM or FM1.

The shrinkable sleeves SS are longer than the mandrels FM, FM1 so as to shrink beneath the bottom defining ends of the mandrels (provide the inturned bottom or curl) of a finished container.

Figures 6A, 6B:
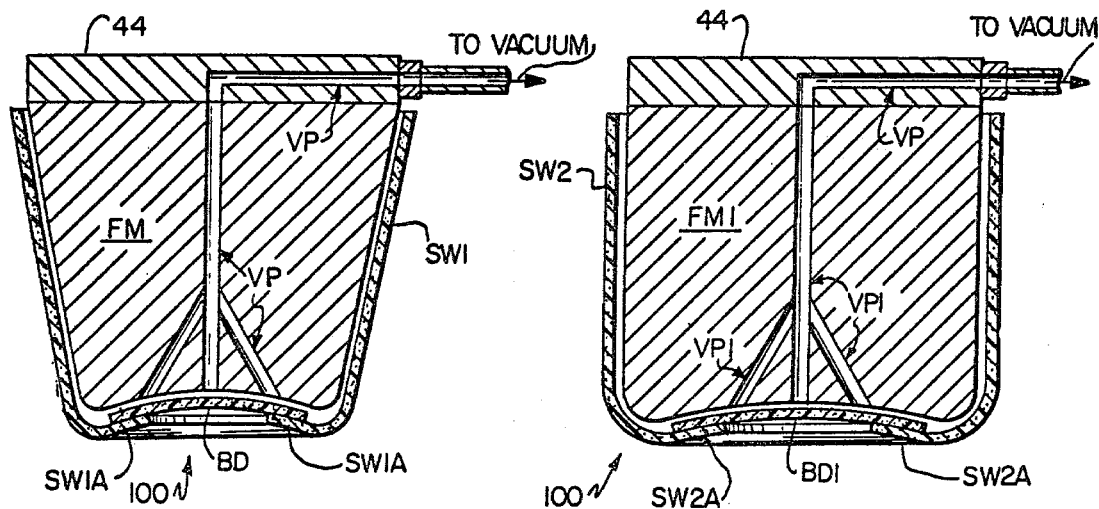
FIG. 6A is a cross section of a frusto-conical mandrel illustrating internal vacuum ports therein and a container formed thereon.
FIG. 6B is a cross section of a substantially cylindrical mandrel illustrating internal vacuum ports therein and a container formed thereon.

For example, as shown in FIG. 6A, a frusto-conical sidewall SW1 is produced by shrinking the sleeves SS on a frusto-conical mandrel FM. A bottom blank BD is provided such that the inturned edges SW1A of the sidewall SW1 will overlap the bottom blank BD after forming the sidewall from the sleeve SS.

The mandrel FM is shown as including internal vacuum ports VP which extend to a vacuum connection VC on the mounting arm 44 of the mandrels as will be more fully described with reference to FIG. 7.

For a container of a more conventional cylindrical shape such as the cross section of an aluminum beverage can or the like, reference is made to FIG. 6B in which a more cylindrical mandrel FM1 having vacuum ports VP1 is shown with a sidewall SW2 shrink formed thereon with inturned edges SW2A overlapping the periphery of a bottom blank BD1, the latter being initially held on the mandrel via the vacuum ports VP1.

Figure 7:
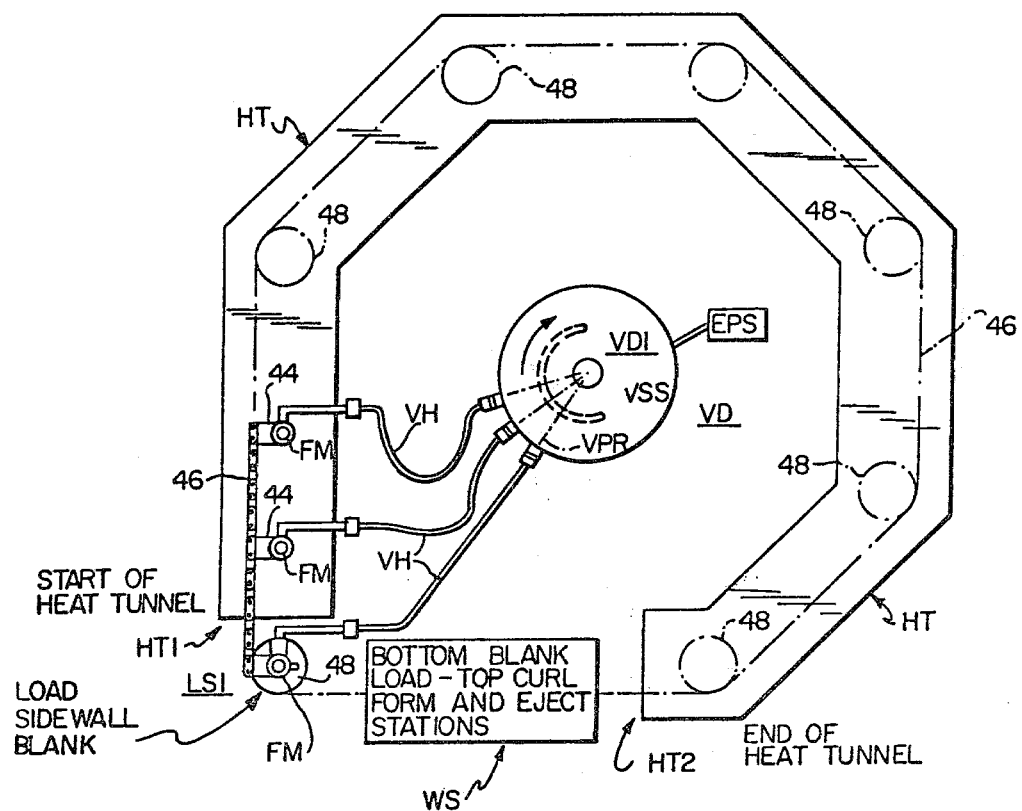
FIG. 7 is a schematic of a cup making system of the present invention.

Referring now to FIG. 7, the finishing mandrels FM (provided with a bottom blank BD as shown in FIG. 6A and to be more fully described with reference to FIGS. 9–11) are loaded with the shrinkable cylinders at a loading station LS1 in the manner previously defined in FIGS. 1–6, and the mandrels FM bearing the sidewall blanks (SW1) are progressively transported through the heat tunnel HT from the entrance HT1 thereof to the exit HT2 on the carrier chain 46 over the drive sprockets 48.

When the mandrels FM leave the exit HT2 of the heat tunnel HT they are carrying formed cups or containers of the configuration shown in FIG. 6A. These cups or containers are then subjected to bottom sealing and a top curl forming operation as will be described with reference to FIGS. 9–11.

The bottom blanks BD (BD1) of FIG. 6A (6B) are held on the mandrels FM (FM1) by means of vacuum applied through vacuum hoses VH. The vacuum hoses VH are in communication with ports VP (VP1) through the support arms 44 and said mandrels.

A vacuum distributor VD is provided centrally of the arcuately disposed heat tunnel HT. All of the vacuum hoses VH are manifolded into the vacuum distributor VD.

As further shown in FIGS. 8A and 8B, the vacuum distributor VD includes a top rotor plate VD1 having a plurality of radially disposed vacuum ports VPR. Each of the vacuum hoses VH is connected to a vacuum port VPR which in turn is in communication with a circular locus in the rotor disc VD1 which corresponds in size to the radius of an arcuate vacuum supply port VSP in a fixed bottom plate VD2 through which an input coupling VIC is provided to connect the supply port VSP to a vacuum source VS.

As the mandrels FM travel through the heat tunnel HT, the rotor disc VD1 rotates on a bearing VB on a support shaft VSS and is held in sufficient sealed engagement therewith. The vacuum ports VPR in the rotary disc VD1 thus come into and out of registry with the vacuum supply port VSP in the support disc VD2 causing vacuum to be applied through the hoses VH to the vacuum ports VP (VP1) in the mandrels FM (FM1) to provide the suction required to hold the bottom blanks BD (BD1) in place on the said mandrels pending the shrink forming of the sidewall blanks SW1 (SW2) to overlap the bottom blanks BD (BD1) at the inturned portions SW1A (SW2A) of the said sidewall blanks.

The arcuate length and position of the vacuum supply port VSP are thus correlated with heat shrink process and extent of travel of the mandrels FM (FM1) in the heat tunnel HT from the time the bottom blanks BD (DD1) are loaded on the said mandrels until sufficient shrinkage of the sidewalls SW1 (SW2) has been achieved to hold the said bottom blanks in place.

Also provided in the fixed bottom disc VD2 is an ejection pressure port EPP fed from an ejection pressure supply source EPS. The ejection pressure port EPP is positioned to time the application of positive pressure through vacuum ports VPR, vacuum hoses VH and vacuum ports VP (VP1) in the mandrels FM (FM1) to eject finished containers therefrom at the ejection portion of the work station WS as will be more fully described with reference to FIGS. 9 and 10.

Figure 9:
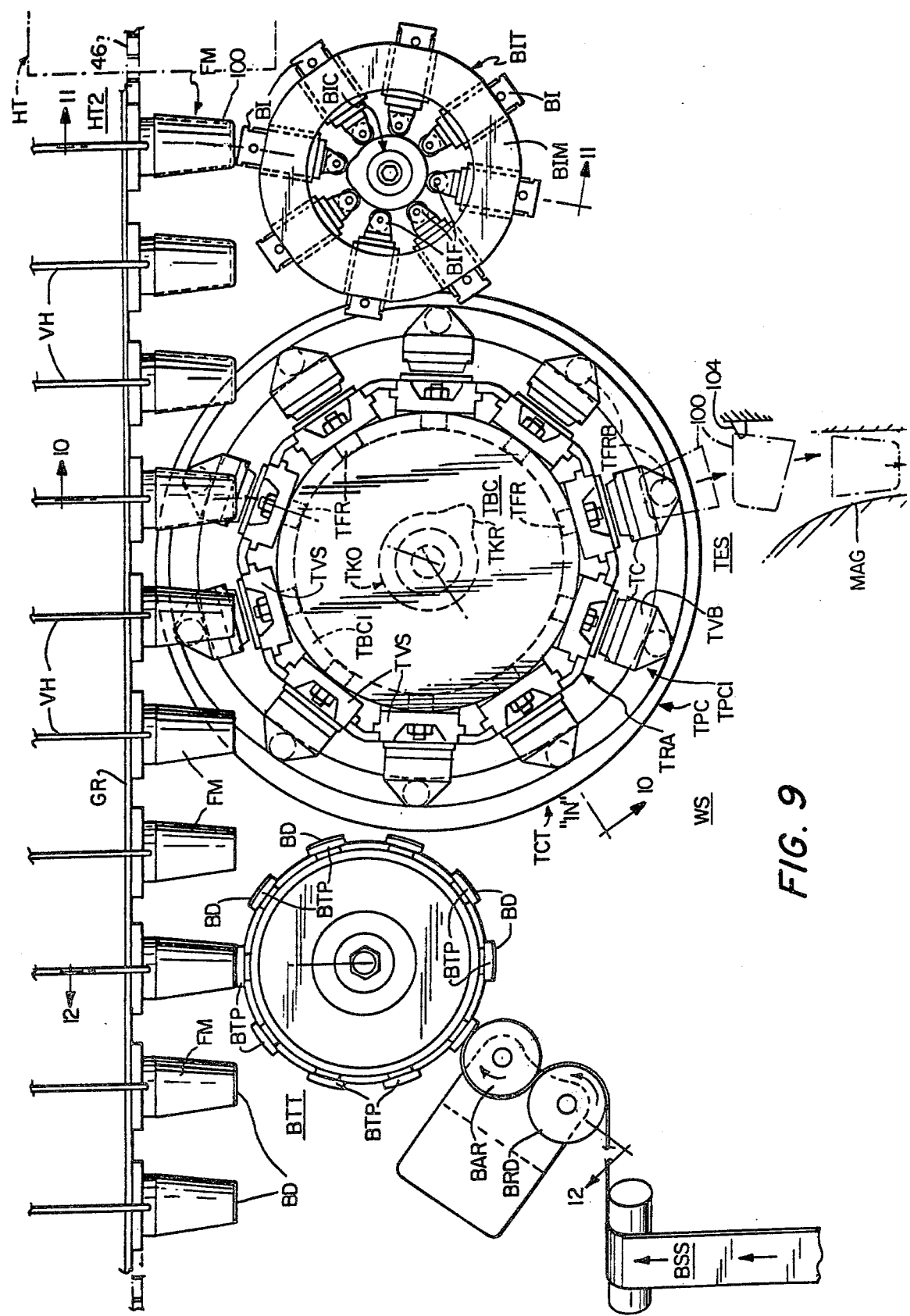
FIG. 9 is a top plan view of bottom finishing, top curl forming and container ejection stations for cup making equipment of the present invention together with a bottom blank feeding station.

Referring to FIGS. 7 and 9, a bank of work stations WS is shown including bottom blank loading, top curl forming, bottom sealing and ejection functions.

As specifically shown in FIGS. 9 and 11; the chain carried mandrels FM are passed along a juxtaposed guide rail GR as they exit the heat tunnel HT at HT2.

The guide rail GR provides a thrust backing to cooperate with a bottom ironing turret BIT having bottom irons BI in a radial array with peripheral spacing therebetween on the said turret corresponding to the spacing between adjacent finishing mandrels FM on the chain 46.

The bottom ironing turret BIT includes a rotating toroidal mounting BIM for the bottom irons BI in which the latter are radially reciprocable. A central cam BIC is provided which constrains the bottom irons BI to engage with the bottom of formed cups or containers 100 on the finishing mandrels FM by means of cam follower wheels BIF and return springs BIS (FIG. 11).

Bottom sealing pressure is regulated by a compression spring BIP mounted in a telescoping section of the bottom iron BI in opposition to the return spring BIS to prevent the bottom irons BI from engaging the bottoms of the containers 100 on the mandrels FM with more than a predetermined maximum sealing force.

As shown in FIGS. 11A and 11B, the bottom iron BI is configured with a raised annular boss BIA dimensioned to press into the inturned edges SW1A of the sidewalls SW1 of the finished cups or container 100 on the mandrel FM at a point at which the bottom blank BD is overlapped to enhance the seal therebetween and insure a liquid tight container bottom structure.

Depending on the properties of the shrinkable foam material and bottom blank material the heat of the shrinking process may provide sufficient heat to form an annular heat seal on the bottom of the containers 100 or the bottom irons BI can be heated to supply additional sealing heat.

As known in the art other heating means, adhesives, solvents or the like may also be used to enhance the ultimate bond between the inturned portions SW1A (SW2A) of the sidewalls SW1 (SW2) of the containers 100 and the bottom blanks BD (BD1).

A purely heat sealed bond is the preferred embodiment, however.

Figure 10:
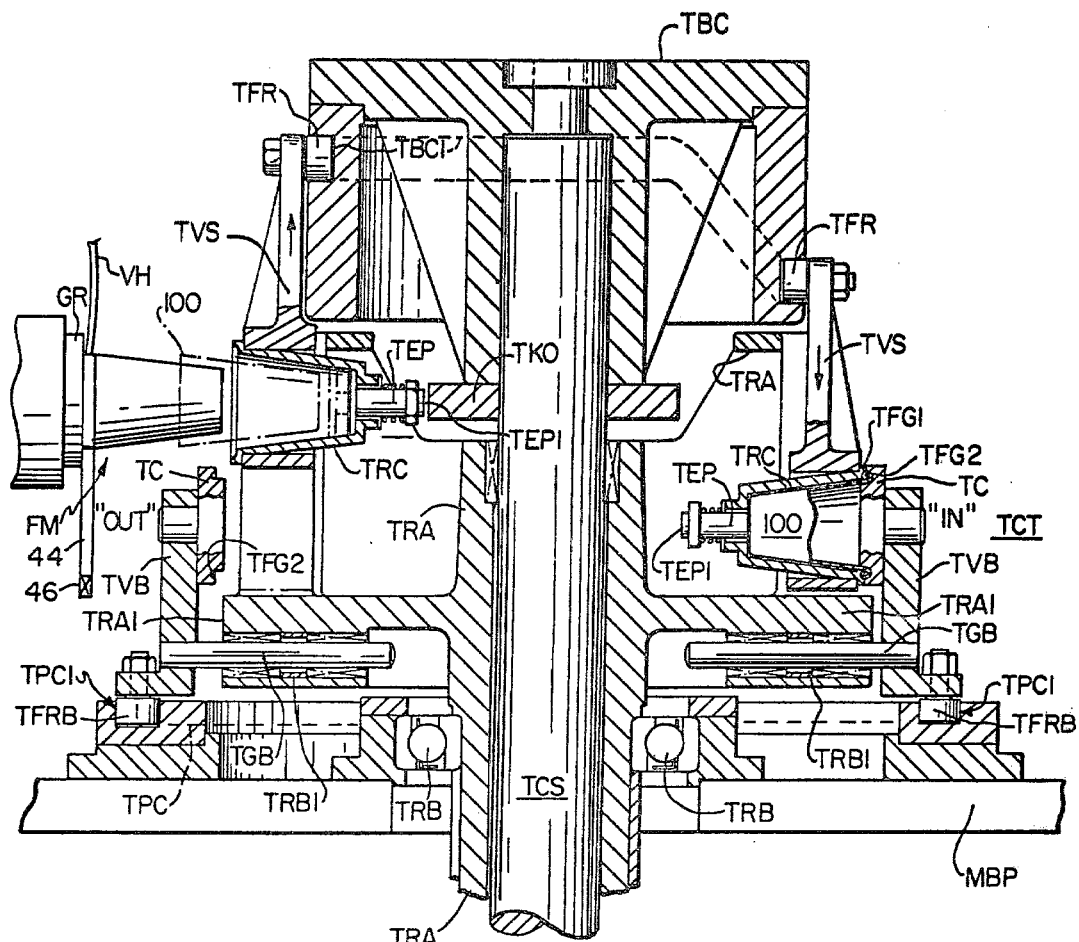
FIG. 10 is a cross-sectional view of the top curl forming station taken along line 10—10 of FIG. 9.

Referring to FIG. 10 in addition to FIG. 9, a top curl forming turret TCT is shown adjacent to the bottom ironing turret BIT for receiving finished cups or containers 100 ejected from the finishing mandrels FM and forming a top curl thereon, i.e., rolling the top rim outward on itself as is a well known practice in the cup and container art.

The top curl turret TCT is shown as including a centrally located barrel cam TBC having a cam track TBC1 in which a plurality of follower rollers TFR ride to constrain vertical movement to respective ones of a like plurality of vertical slides TVS on which are mounted radially disposed and outwardly opening cups receiving cavities TRC.

The barrel cam TBC is coaxially and fixedly mounted on the upper end of a non-rotating central shaft TCS for the turret TCT the said shaft TCS being journaled through a hub assembly TRA which is mounted for relative rotation to the shaft TCS on a machine base plate MBP in bearing means TRB.

The hub assembly TRA provides outboard slots for the vertical slide members TVS and an annular plate TRA1 beneath which a plurality of radially disposed bearing means TRB1 are provided to receive reciprocating guide bars TGB for top curl forming tools TC mounted one in registry with each cup receiving cavity TRC on vertical bars TVB each extending upward from respective guide bar TGB and a cam follower roller TFRB engaging a cam track TPC1 in an annular plate cam TPC fixedly mounted on the machine base plate MBP.

Between the hub assembly TRA and the barrel cam TBC on the central shaft TCS is an annular kick-out cam TKO having a single kick-out rise TKR at a desired ejection station position TES (FIG. 9) to effect ejection of the containers 100 from the cavities TCR.

The kick-out cam TKO is engaged in the uppermost positions of the container cavities TRC and vertical slides TVS by the inboard tips TEP1 of ejection pin assemblies TEP which are spring biased to telescopically reciprocate in and out of the base of the container receiving cavities TRC to eject finish cups or containers 100 therefrom by a plunger action induced by the knock-out cam TKO.

Figure 10A:
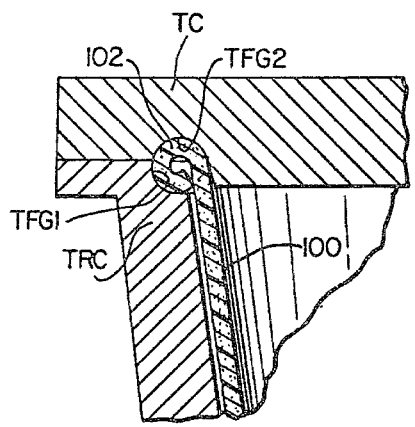
FIG. 10A is an enlarged view of the top curl tool.

Referring additionally to FIG. 10A, the top curl tool TC is shown in the "IN" position as constrained by the plate cam TPC to cause mating top curl forming surfaces TFG1 in the periphery of the cavities TRC and TFG2 in the top curl tool TC to force the top of each container 100 into the curled configuration 102 shown in FIG. 10A and at the "IN" position of the top curl tool TC in FIG. 10.

Thus, in operation, rotation of the hub assembly TRA on the central shaft TCS causes coordinated vertical movement of the slides TVS and the receiving cavities. TCR and radial movement of the curling tools TC to maximum height and radially outward positions, respectively, at the "OUT" position in FIG. 10 and minimum height and innermost radial positions, respectively, at the "IN" position of FIG. 10.

This is effected by the coordinated shapes of the cam tracks TBC1 and TPC1 on the barrel cam TBC and plate cam TPC, respectively.

In the "OUT" position of the top curl tool TC, the receiving chamber TCR is shown in FIGS. 9 and 10 as being indexed to receive a cup or container 100 from the finishing mandrel FM as ejected therefrom by positive pressure in the vacuum hose VH.

The hub assembly TRA rotates in synchronism with the travel of the mandrels FM on the chain 46 and the receiving chambers TRC bearing a container 100 progress toward the "IN" position of FIGS. 9 and 10 in which the curling tool TC has been brought into juxtaposed registry with the receiving cavity TRC to form the top curl 102 on the container 100 (see FIG. 10A).

Subsequently, the tool TC and the receiving cavity TRC separate rapidly and the latter rapidly rises under control of the barrel cam TBC to engage the inboard end TEP1 of the ejection plunger TEP with the kick-out cam TKO and the ejection rise TKR thereon at the ejection station TES (see FIG. 9).

This ejects the containers 100 into engagement with an inverting detent 104 in a magazine chute MAG such that the finished containers are magazined in an upright position.

Prior to the placing of the cylinders 10C onto the finishing mandrels FM (FM1) a bottom blank or disc BD must be placed on the outboard end of the said mandrels to be held thereon by vacuum in the vacuum lines VH from the vacuum distributor VD as previously shown in FIGS. 6A, 6B, 8A and 8B.

To accomplish this function, a supply of bottom blanks BD and a means for transferring them from the supply to the finishing mandrels FM (FM1) must be provided.

To this end, referring jointly to FIGS. 9 and 12, bottom strip stock BSS is fed to a rotary die roller BRD and anvil roll BAR to cause the die roller to cut discs BD from the strip stock BSS and present it to a bottom transfer plate BTP on a bottom transfer turret BTT adjacent to the anvil roll BAR and indexed therewith to pick up each bottom disc BD as it is cut.

The bottom transfer plate BTP bearing the bottom disc BD is eventually indexed into registry with a passing finishing mandrel FM (FM1) and transferred thereto.

The initial pick up of the bottom disc BD by the transfer plate BTP is made by vacuum applied via a vacuum port BTV through vacuum distributors BVD1 and BVD2.

The distributor BVD1 rotates with the bottom transfer plates BTP on the turret BTT while the distributor BVD2 remains stationary.

Vacuum is supplied through a vacuum hose BVH from a vacuum supply source BVS in the base of the turret BTT. The fitting of the hose BVH to the fixed distributor BVD2 acts as a valve to provide vacuum to the ports BTV at all locations via the distributors BVD1, BVD2 except at the right hand position shown in FIG. 12 for the bottom transfer plates BTP. In this position, there is no vacuum in the line BTV and the vacuum from the hose VH in the finishing mandrel FM, now coaxially indexed with the bottom transfer plate BTP will act to strip the bottom disc BD from the plate BTP and onto the base of the mandrel FM.

IN-LINE FILLING OF CONTAINERS AS THEY ARE MADE

As the finished containers 100 enter the magazine MAG at the ejection station TES of the top curl turret TCT, the containers can be fed, one by one, as known in the art to dial-like feeder discs 104 which are indexed by a shaft 106 to feed the containers 100, one-by-one to a container filling station 110 where food product 112 in a measured amount is discharged into the container 100. The container 100 is elevated by a pedestal 108 to the filling station 110, which pedestal withdraws to return the container to rest in the dial 104 on its top curl 102.

The container 100 with food 112 is then transferred to another station where a lid 114 is pressed onto the top curl 102 of the container 100 by a seating jig 116 as will now be described with reference to FIG. 14.

The jig 116 is provided with an ejection plunger 118 to eject the lid and container from the jig 116 after seating is completed. An air gap 120 is maintained between the plunger 118 and the lid 114 in the event that vacuum is needed to initially retain the lid 114 in the jig 116.

A plurality of shaped pressure rollers 122 such as schematically illustrated, are spaced around the top curl 102 and produce a curved seam 114R between the top curl 102 and the lid 114.

A pedestal 108A is utilized to transfer the filled container 100 from the dial 104 to the lid seating jig 116.

In an alternate embodiment for seating a lid 114A on a container 100A, having an uncurled top edge 102A, a top edge overlap 114RA on the lid 114A is clinched in place by segmented jaws 124 in cooperation with a seating jig 116A. This embodiment is shown schematically in FIG. 15.

Figures 13, 14, 15:
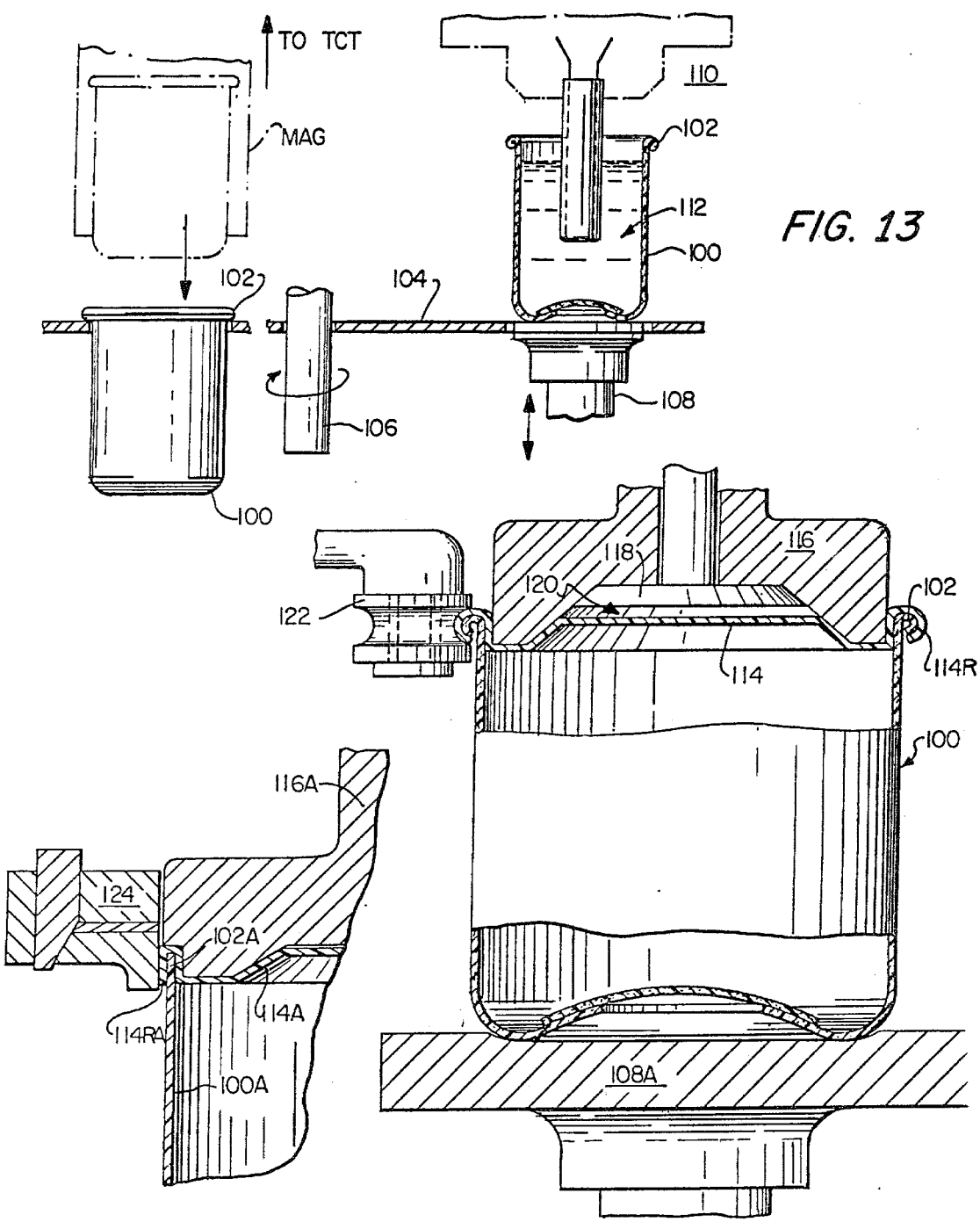
FIG. 13 is a schematic of a container filling station.
FIG. 14 is a schematic of a filled container capping station.
FIG. 15 is a schematic of a filled container capping station illustrating a different cap or lid from that illustrated in FIG. 14.

Rotary transfer dials 104 and pedestals 108 and filling stations 110 such as those shown in FIG. 13 are known in the art.

For example, U.S. Pat. No. 3,225,899 for Machine For Packaging Food Products of J. B. West, issued Dec. 28, 1965 and U.S. Pat. No. 3,345,801 for Auxiliary Unit For Packaging Machine to J. B. West, issued Oct. 10, 1967 illustrate container filling, capping and handling machines of the type generally described with reference to FIGS. 13, 14 and 15.

With the present invention, cans and containers can be made as needed and no storage of completed containers is necessary in conjunction with a given canning or packaging run.

Only rolls of sidewall and bottom blank material need be stored to effect a supply of containers for holding a given volume of food product.

This also permits the use of non-nestable container shapes which heretofore have been undesirable because of their bulk in an unfilled container. Once filled, of course, even nestable containers assume such bulk in storage.

Thus, with the continuous container manufacturing method and means of FIGS. 1–12, feeding the continuous filling and capping equipment typified by FIGS. 13–15, an extremely efficient operation is provided which requires only a minimum of warehouse space for the containers required.

SUMMARY OF CONTAINER MAKING OPERATION

As illustrated in FIGS. 1–3, foam plastic strip stock, stretch oriented on its length 10B, is cut into rectangular blanks 10A and transferred transversely of its length 10B through continuous folding means M, H1, H2, FR1, FR2 and a heat seaming means PB to form seamed cylinders 10C circumferentially stretch oriented.

The cylinders 10C are placed over finishing mandrels FM (FM1) having bottom blanks BD already in place from a bottom transfer turret BTT (FIGS. 9, 12).

A chain drive 46 (FIGS. 1, 3, 7, 9) carries the mandrels FM (FM1) through a heat shrink tunnel causing the cylinders 10C to shrink and assume the shape of the mandrels FM (FM1) as shown in FIGS. 6A/6B). The sidewalls SW1 (SW2) shrink beneath the mandrels FM (FM1) to place annular overlapping portions SW1A (SW2A) over the outer edges of the bottom disc BD (BD1) as further shown in FIGS. 6A (6B).

As the mandrels FM (FM1) bearing shrink formed containers 100 leave the heat tunnel HT (FIGS. 7, 9, 10, 11) bottom seams are formed in the overlap by bottom irons BI on a bottom ironing turret BIT in a manner most specifically illustrated in FIGS. 11A, 11B.

The top curl 102 is then formed on the containers 100 by discharging them from the mandrels FM (FM1) into the receiving chambers TRC of the top curl forming turret TCT which, as shown in FIG. 10A, places a top curl 102 in each container 100 with top curl tool TC.

Subsequent to the forming of the top curl 102, the container 100 is ejected from the top curl turret TCT at an ejection station TES, inverted to proceed bottom first into a magazine MAG and thus placed in readiness for either packaging or for processing in filling equipment.

THE BOTTOM BLANK APPARATUS AND METHOD

Figure 16A:
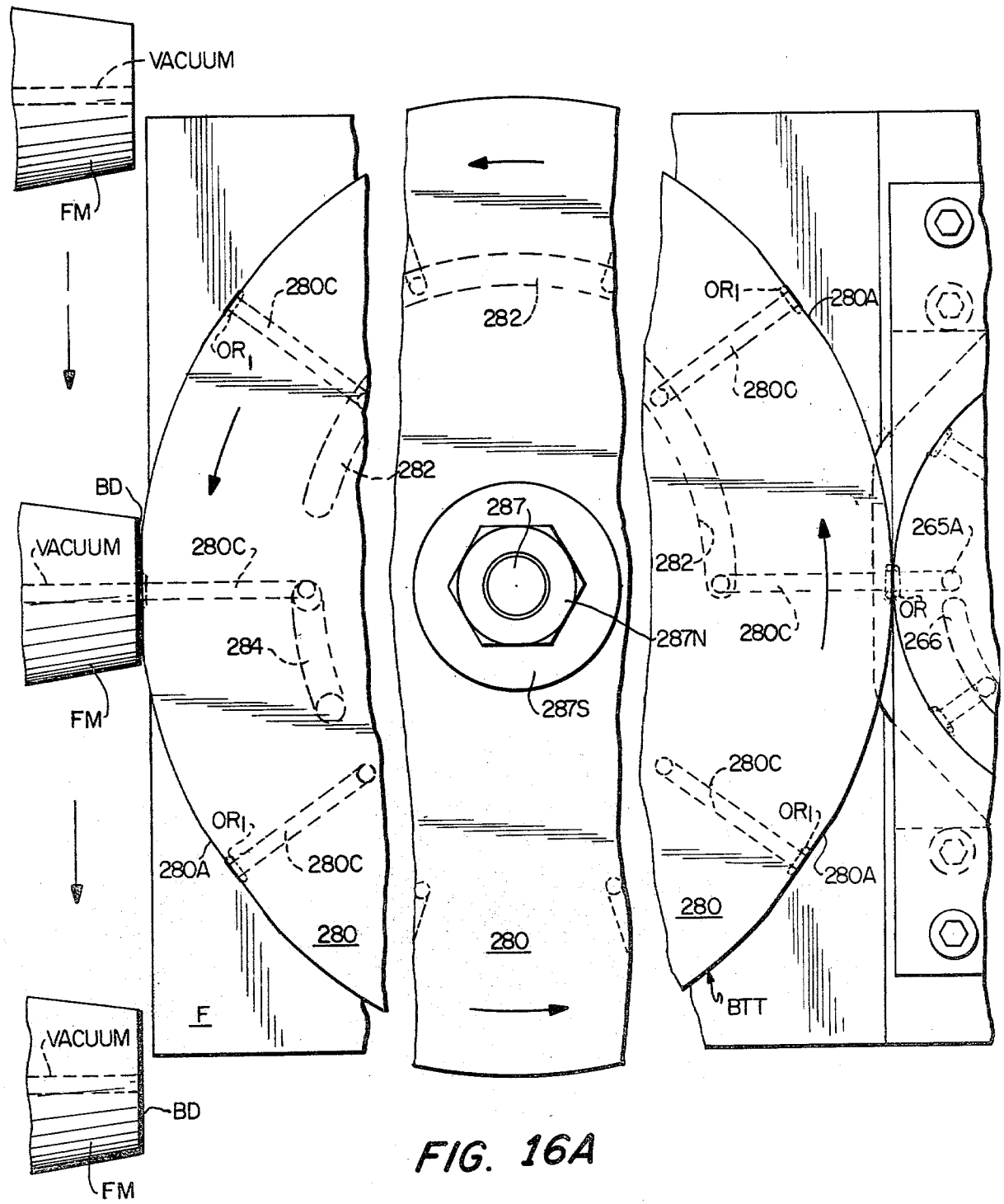
FIG. 16A is a top plan view of a bottom blank handling apparatus according to the present invention.
Figure 18:
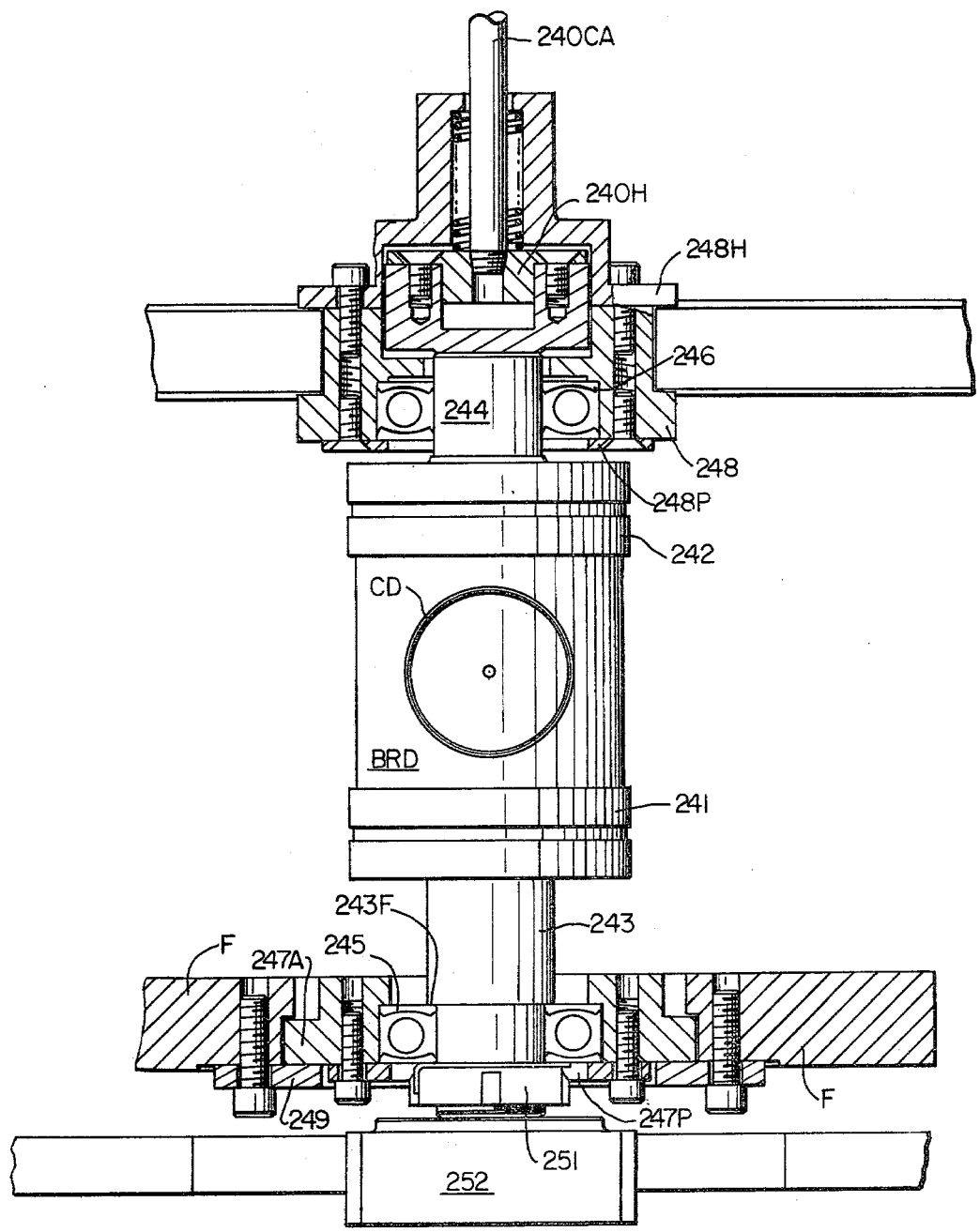
FIG. 18 is a side view of the rotary die and illustrating a partial cross-section view of the framework.

FIGS. 16A and 18 illustrate a more detailed preferred embodiment of a bottom blank handling apparatus for severing bottom blanks from a web feed roll and tangentially transferring the bottom blanks to final forming mandrels at a compatible velocity and spacing.

Figure 16B:
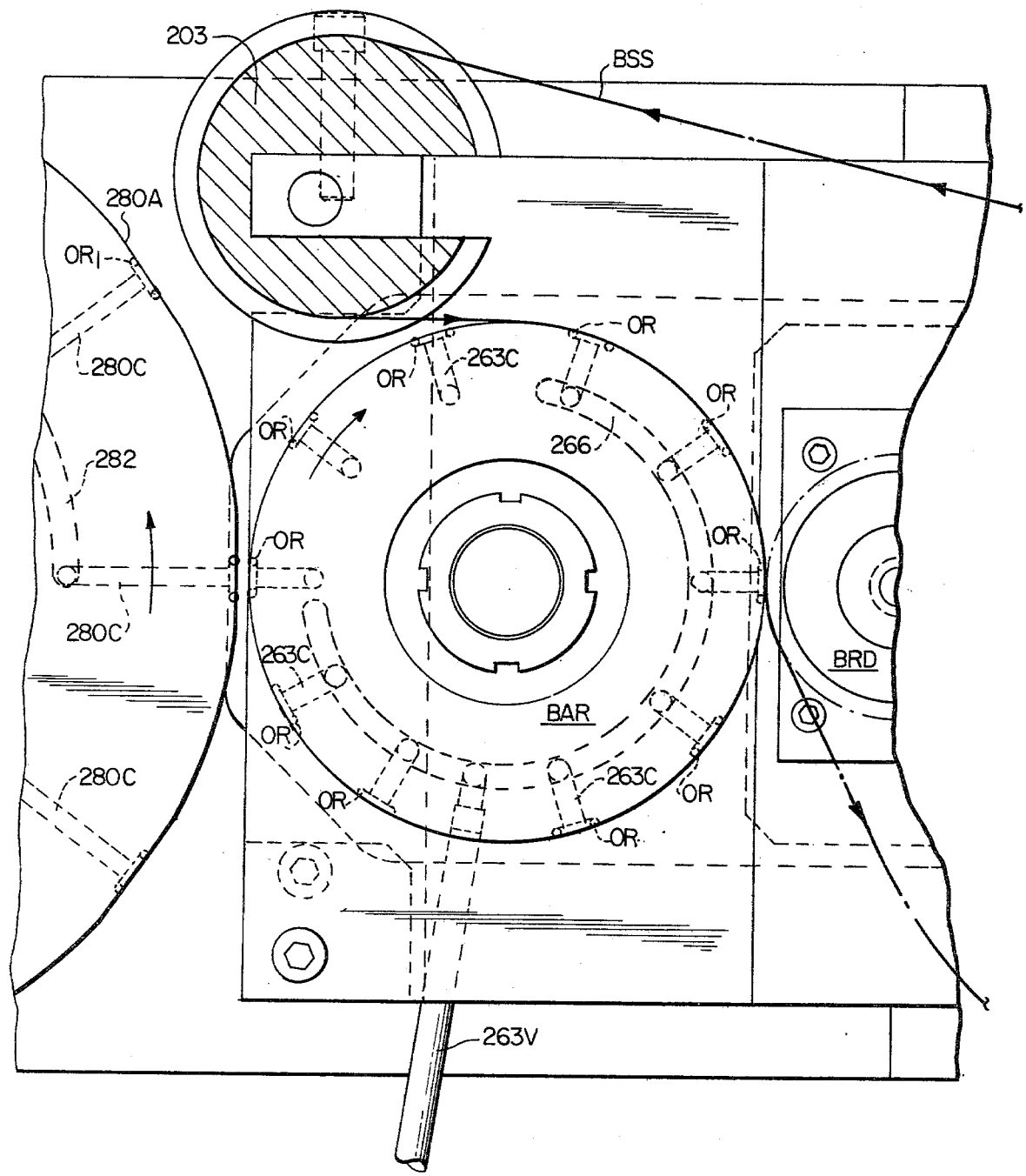
FIG. 16B is a continuation of the top plan view of a bottom blank handling apparatus as illustrated in FIG. 16A.
Figure 16C:
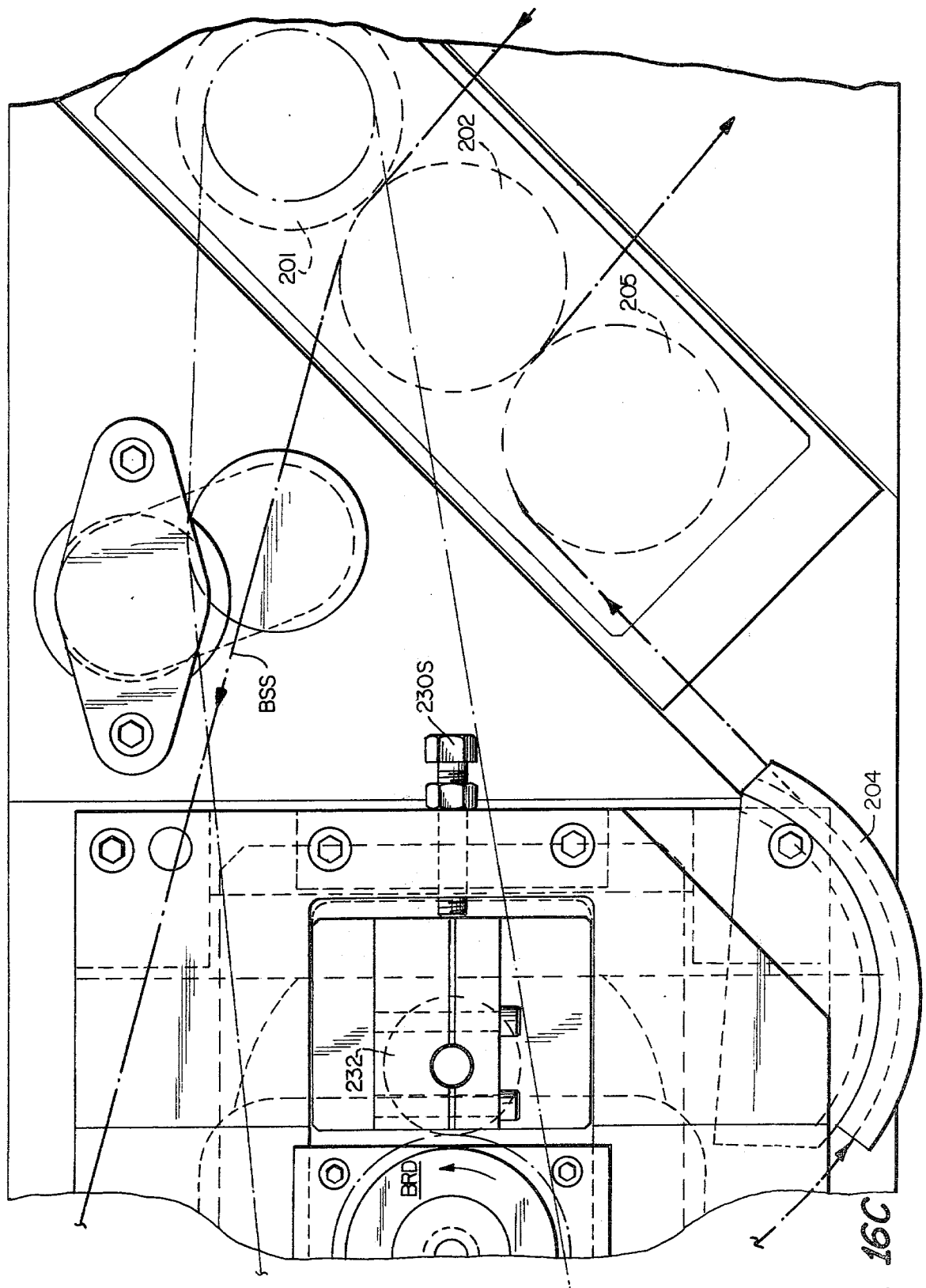
FIG. 16C is a continuation of a bottom blank handling apparatus as illustrated in FIGS. 16A and 16B and further illustrating the bottom blank web feed mechanism.

FIGS. 16A through 16C illustrate a top plan view of the detailed disclosure of a bottom blank handling apparatus of the present invention. FIG. 16A illustrates a top plan view of the left-hand portion of the apparatus. FIG. 16B illustrates a top plan view of the center portion of the apparatus. FIG. 16C illustrates a top plan view of the right-hand portion of the apparatus.

As illustrated in FIGS. 16A through 16C, a bottom strip stock BSS is fed between the pinch rollers 201 and 202, around the stationary guide 203 and is held against the outer surface of the anvil roll BAR. Thereater, the bottom strip stock BBS passes between the rotary die roller BRD and the anvil roll BAR where the bottom blanks BD are severed from the bottom strip stock. As illustrated in FIG. 16B, after the bottom blanks BD are severed from the bottom strip stock BSS the remaining scrap portion of the bottom strip stock is conveyed around the stationary guide 204 and between the pinch rollers 202 and 205 to discharge the scrap material. In a preferred embodiment of the present invention, the pinch rollers 201, 202, and 205 are covered with a polyurethane material. The pinch rollers 201 and 202 pull the bottom strip stock from a roll of material to feed the web. Similarly, the pinch rollers 202 and 205 pull the scrap bottom strip stock from between the rotary die BRD and the anvil roll BAR to discharge the scrap material.

The rotary die roller BRD is mounted in sliding bearing blocks so that the jaw screws 230S may accurately position the rotary die adjacent the first transfer turrent or anvil BAR. Referring additionally to FIGS. 17A, 17B, 17C and 18, the rotary die BRD includes five cutters CD positioned around the circumference thereof. Further, the rotary die includes two bearing portions 241, 242 which are designed to engage cam followers 231, 232 respectively. The cam followers 231, 232 are mounted on a shaft 233 positioned in cam housing 234. Further, the rotary die BRD includes outwardly projecting portions 243, 244 which are mounted in bearings 245, 246, respectively. The bearings 245, 246 are mounted on the slidable bearing blocks 247, 248 which enable the rotary die to be precisely positioned adjacent the first transfer turret or anvil BAR.

Figure 17A:
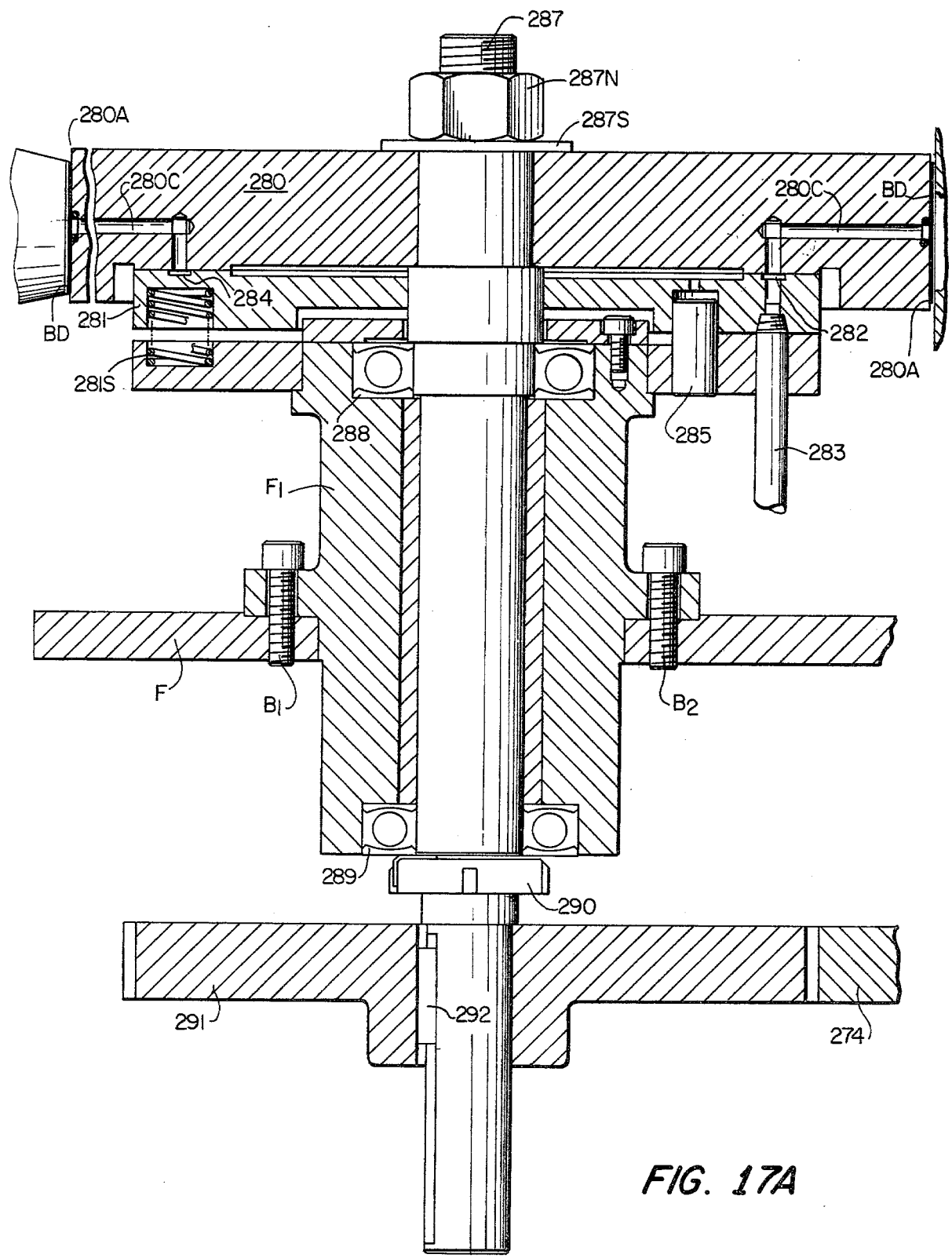
FIG. 17A is a side elevation of the bottom blank handling apparatus as illustrated in FIG. 16A.

The sliding bearing block 247 includes an outwardly projecting portion 247A which is slidably received between a flange of the framework F and a plate 249 which is secured to the framework F. As illustrated in FIG. 18, the outer portion of the bearing 245 is securely positioned within an opening in the sliding bearing block 247. The inner portion of the bearing 245 mates with the outwardly projecting portion 243 and is precluded from axial movement by engagements with the flange 243F. Further, the bearing 245 is held in place by means of the plate 247P which is secured to the sliding bearing block 247. To ensure the positioning of the bearing 245 relative to the outwardly projecting portion 243 of the rotary die BRD a threaded nut 251 is positioned adjacent the lower end of the outwardly projecting portion 243. Further, as illustrated in FIGS. 17A and 18, a gear 252 is positioned adjacent the lowermost portion of the outwardly projecting member 243 and is secured thereto by means of a key 252K and a bolt 252B.

The sliding bearing block 248 together with the housing portion 248H slidably mates with the framework F at the uppermost portion of the rotary die BRD. The outermost portion of bearing 246 is securely positioned within the sliding bearing block 248. The innermost portion of the bearing 246 mates with the outwardly projecting portion 244 of the rotary die BRD. To ensure the positioning of the bearing 246 relative to the rotary die BRD, a plate 248P is secured to the sliding bearing block 248. The plate 248P prevents avial movement of the bearing 246.

Figure 17B:
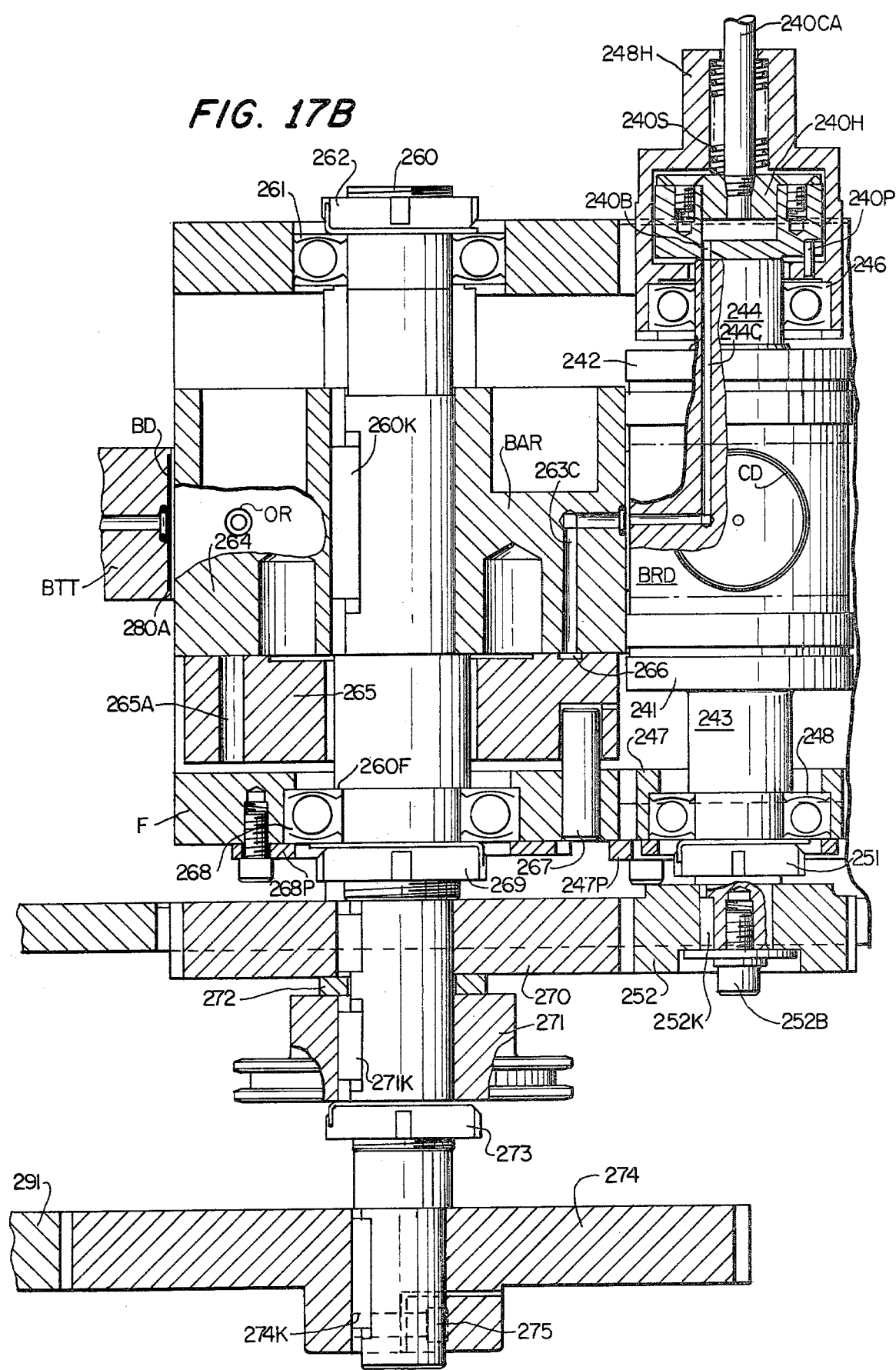
FIG. 17B is a side elevation of the bottom blank handling apparatus as illustrated in FIG. 16B.
Figure 17C:
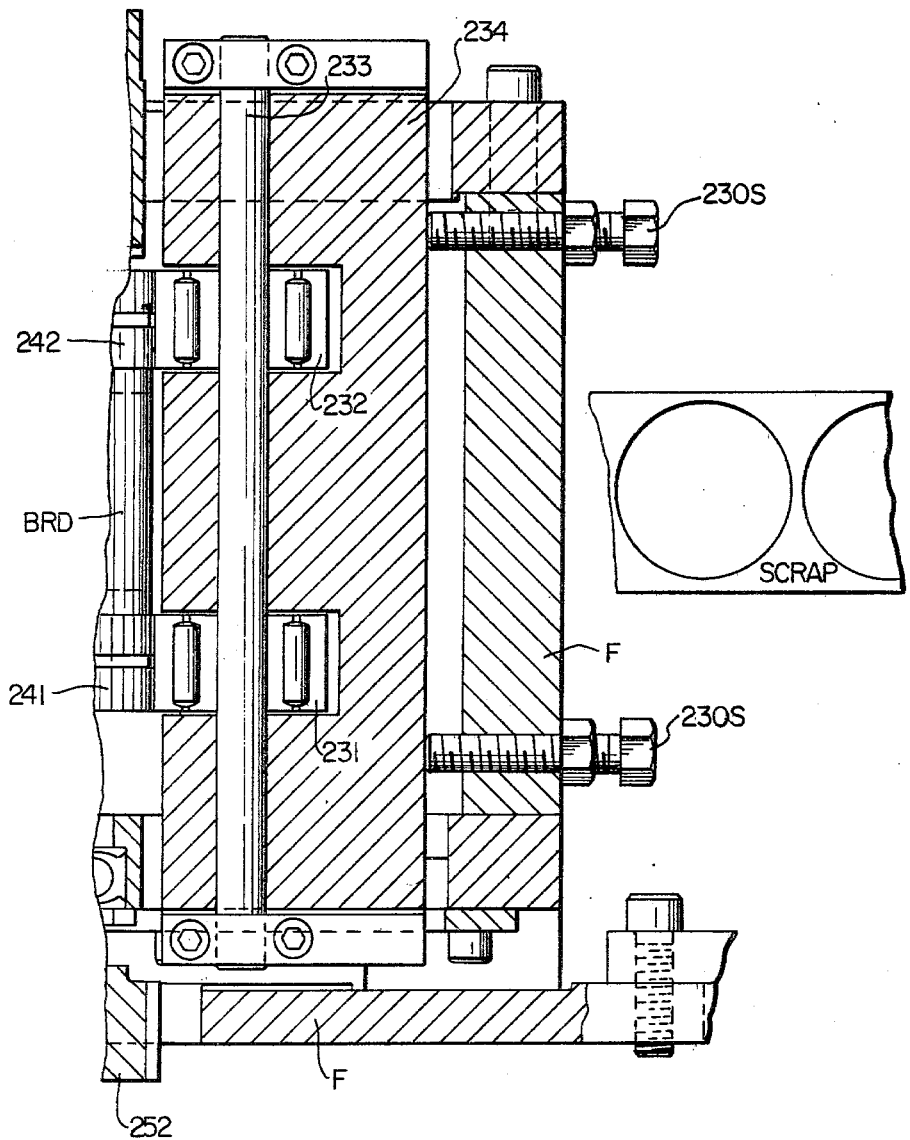
FIG. 17C is a side elevation of the bottom blank handling apparatus as illustrated in FIG. 16C.

Referring to FIGS. 17B and 18, in one embodiment of the present invention a compressed air supply 240CA may be supplied to the upper portion of the housing 248H of the sliding bearing block to facilitate the transfer of a severed bottom blank BD from the bottom strip stock BSS and cutter CD to the peripheral surface of the first transfer turret or anvil BAR. The compressed air supply 240CA is securely threaded into the upper surface of a compressed air housing 240H. The upper surface of the compressed air housing is firmly secured to the lower portion of the housing. In this embodiment of the present invention, the lower portion of the housing is constructed of nylatron.

As illustrated in FIG. 17B, the compressed air housing is prevented from rotation by means of a pin 240P. Further, the compressed air housing is spring biased downwardly by means of the spring 240S positioned within the upper portion of the housing 248H. The compressed air housing 240H includes an opening 240B disposed in the lowermost portion thereof which communicates compressed air from the compressed air supply 240CA to a conduit 244C of the rotary die BDR. It should be noted, that the outwardly projecting portion 244 includes five conduits 244C disposed longitudinally therein which communicate compressed air to each of the cutting dies disposed around the circumference of the rotary die BRD. Since the compressed air housing 240H includes only one opening 240B disposed in the bottom portion thereof, compressed air is transmitted to one of the longitudinally disposed conduits 244C only when the die positioned on the circumference of the rotary die BRD is in the process of severing a bottom blank BD from the bottom strip stock BSS. In other words, the compressed air is supplied to the rotary die to facilitate the discharge of a bottom blank BD to the anvil BAR only after the bottom blank has been severed from the bottom strip stock BSS. Since the compressed air housing 240H is keyed to the sliding bearing housing 248 by means of a pin 240P, rotation of the compressed air housing is prohibited. Therefore, compressed air is only supplied when the opening 240B and the longitudinally disposed conduit 244C are aligned as illustrated in FIG. 17B.

Although in one embodiment of the present invention compressed air may be supplied to a compressed air housing 240H to facilitate the discharge of a bottom blank BD to the anvil BAR, it should be understood that the present invention is not limited to this particular means of aiding the discharge of the severed bottom blanks BD. For example, in the preferred embodiment of the present invention, illustrated in FIG. 16B, as the bottom strip stock BSS wraps around the rotary die BDR after the bottom blanks BD are severed therefrom, the resiliency of the bottom strip stock BSS actually pops the bottom blanks BD from the bottom strip stock to the anvil BAR.

Accurate positioning of the rotary die BRD adjacent the hardened anvil BAR is achieved by the cam followers 231, 232 mounted on the shaft 233 within the cam housing 234. The cam housing 234 is slidably mounted adjacent the rotary die BRD. As previously discussed, the jack screws 230S are threaded within openings in the framework F and engage the cam followers housing 234. By rotating the jack screws 230S the cam followers housing 234 is displaced towards the rotary die BRD. The cam followers 231, 232 are likewise displaced against the bearings 241, 242 to press the rotary die against the anvil BAR. Therefore, adjusting the jack screws 230S regulates the relative contact of the rotary die BRD against the anvil BAR to ensure proper die penetration of the bottom strip stock BSS.

Referring to FIGS. 16B and 17B the first transfer turret or anvil BAR is illustrated as being mounted on an axle 260 being keyed thereto by the member 260K. The upper portion of the axle 260 is mounted in a bearing 261 which is positioned in the framework F. The outermost end of the axle 260 is secured to the bearing 261 by means of a screw nut 262.

The first transfer turret or anvil BAR has ten bottom blank stations positioned around the circumference thereof. As illustrated in FIG. 17B, each station for receiving a bottom blank BD includes an "O" ring OR positioned adjacent to the circumferential portion of the anvil BAR to effect a better seal and permit a more accurate transfer. The "O" rings are positioned adjacent to and concentric with the ends of the vacuum conduits 263C which are supplied with a source of vacuum by means of a manifold 266 from a point prior to the severing of the bottom blanks BD from the bottom strip stock BSS by the rotary die BRD to a point immediately prior to the tangential transfer to the second transfer turret BTT. The "O" rings OR are preferably positioned in grooves by means of cement or the like and project slightly outwardly from the peripheral circumferential surface of the anvil BAR. As illustrated in FIG. 16B, the vacuum conduits 263C are supplied with a source of vacuum from a point prior to the severing of the bottom blanks BD by the rotary die BRD through an arc of approximately 180° until just prior to the transfer of the bottom blanks BD to the second transfer turret BTT.

In a preferred embodiment of the present invention, the anvil BAR includes an upper portion 264 which may be constructed from steel. Further, the anvil includes a lower portion 265 which may be constructed of nylatron. The upper portion of the anvil 264 is keyed to rotate with the axle 260. The lower portion of the anvil 265 is prevented from rotating by means of the pin 267 which is inserted in the framework F. The lower portion of anvil 265 includes a manifold 266 positioned in the upper surface thereof so as to communicate the supply of vacuum to the conduits 263C between the pick-up point of the severed bottom blank BD adjacent the rotary die BRD to the tangential transfer of the bottom blank BD to the second transfer turret BTT. The lower portion of the anvil 265 includes a through opening 265A for venting the conduit 263C to atmosphere at the time of tangential transfer of the bottom blank BD from the anvil turret BAR to the second transfer turret BTT.

A bearing 268 is secured to the framework F and mounted on the axle 260 in a position beneath the anvil turret BAR. The bearing 268 is prevented from axial movement along the axle 260 because of the flange 260F. Further, a plate 260P is secured to the framework F and locks the bearing 268 in place relative to the axle 260 and the framework F. Further, a screw nut 269 is mounted on the axle 260 and ensures the proper positioning of the bearing 268 and the first transfer turret or anvil BAR.

A gear 270 is positioned on the axle 260 and keyed thereto by member 270K. Further, a pulley take-off 271 is positioned on the axle 260 and keyed thereto by member 271K. The gear 270 is spaced by element 272 from the pulley 271. Further, the pulley 271 is accurately positioned relative to the gear 270 by means of a threaded nut 273. It should be understood that the pulley 271 is connected to the gear drive for the pinch rollers 201, 202 and 205.

A gear 274 is mounted on the axle 260 and is keyed thereto by the element 274K. The gear is further secured to the axle 260 by the locking screw 275.

Referring to FIGS. 16A, and 17A the second transfer turret BTT is shown as including ten bottom blank holding stations positioned around the circumference thereof and further includes an upper portion 280 and a lower portion 281. The lower portion 281 is spring biased by element 281S into engagement with the upper portion 280. In a preferred embodiment of the preferred embodiment of the present invention the upper portion 280 may be constructed of nylatron and the lower portion 281 may be constructed of steel.

The upper portion 280 of the second transfer turret BTT includes a plurality of conduits 280C which project upwardly and radially outwardly. An "O" ring OR$_1$ is positioned adjacent to and concentric with the ends of each conduit 280C to effect a better seal and permit a more accurate transfer. As illustrated in FIG. 16A, the conduits 280C are in communication with a manifold or distributor 282 from the initial tangential pick-up of a bottom blank BD from the anvil BAR to a point just prior to the tangential discharge of the bottom blank. The manifold or distributor 282 is connected to a vacuum line 283 which supplies a source of vacuum to hold the bottom blank BD adjacent the second transfer turret BTT during a portion of its rotation.

As illustrated in FIG. 16A, the upper portion 280 of the second transfer turret BTT includes a substantially flat peripheral area 280A on which a bottom blank BD may be positioned. The "O" rings OR$_1$ are positioned one at each of the areas 280A located around the circumference of the second transfer turret BTT adjacent to and concentrically with the ends of the conduits 280C to provide positive seals for enhancing the transfer of the blanks between turrets and ultimately to the mandrels FM. The "O" rings OR$_1$ are positioned by cementing or the like in annular surface grooves formed in the surface of the peripheral areas 280A and project slightly outwardly therefrom. The peripheral areas 280A and the "O" rings OR$_1$ comprise the holding stations for the bottom blanks BD on the turret BTT.

The lower portion 281 of the second transfer turret includes a manifold or distributor 282 positioned on a portion of the upper surface thereof. Further, the lower portion 281 includes a second manifold or distributor 284 which is in communication with the conduits 280C at the tangential discharge point of the bottom blanks BD. The manifold 284 is thus vented to atmosphere at the time of transfer to assure the transfer of the bottom blank BD from the second transfer turret to the final forming mandrel FM the latter being provided with a similar vacuum holding means as illustrated in FIG. 16A.

The lower portion 281 is prevented from rotation relative to the framework F by means of a pin 285. Therefore, since the lower portion 281 is held stationary and the upper portion 280 rotates about the axle 287. The manifold or distributor 282 is accurately positioned to communicate the source of vacuum to the blank BD from the anvil BAR to a point adjacent to the discharge of the bottom blanks. Further, holding the lower portion 281 stationary relative to the upper portion 280 ensures the accurate alignment of the manifold or distributor 284 to vent the conduits 280C to atmosphere at the discharge point of the bottom blank BD from the second transfer turret BTT.

As illustrated in FIG. 17A, the upper portion of the manifold 280 is mounted on an axle 287 and is held stationary thereto by means of a washer 287S and a threaded nut 287N. Further, the upper portion 280 of the second transfer turret BTT is positioned on a flange 287F which accurately positions the upper portion 280 relative to anvil BAR and the final forming mandrels FM.

The lower portion 281 of the second transfer turret BTT is mounted adjacent the axle 287 but is held stationary with respect thereto be means of the pin 285 which is positioned in a portion of the framework F. In addition, the axle 287 is mounted in bearing units 288 and 289 which are securely positioned in the framework housing F$_1$. The framework housing F$_1$ is secured to the framework F by a plurality of bolts B$_1$ and B$_2$ which prevent rotation of the framework housing F$_1$. A threaded nut 290 is positioned on the axle 287 and accurately positions the axial displacement of the second transfer turret BTT relative to the framework F.

Positioned adjacent the lowermost portion of the axle 287 is a gear 291 which is keyed to the axle by member 292. It should be noted, that the gear 291 is constructed to be the same size as the gear 274 and is in meshing engagement therewith. Further, the lowermost end of the axle 287 is coupled to a gear reducer which in turn may be coupled to a common drive element may supply power to the entire container forming machine.

OPERATION OF THE PREFERRED EMBODIMENT

In the preferred embodiment of the apparatus and method for severing and transferring bottom blanks from a web feed roll to a work station the bottom strip stock BSS is fed between the pinch rollers 201, 202, which may be covered with polyurethane, and tend to pull the bottom strip stock BSS (web) from the web roll. The bottom strip stock BSS is fed around a stationary guide 203 and thereafter passes between an anvil turret BAR and a rotary die BRD where the cutter die CD severs a bottom blank BD from the bottom strip stock. The stationary guide 203 is positioned so that the bottom strip stock BSS engages the peripheral surface of the anvil BAR substantially before a bottom blank BD is severed therefrom. The manifold 266 is positioned so that the conduits 263C are supplied with vacuum prior to the severing of the bottom blanks BD by the rotary die BRD. As the bottom strip stock BSS passes between the anvil BAR and the rotary die BRD and begins to wrap around the rotary die BRD after the bottom blanks BD are severed therefrom, the resiliency of the bottom strip stock BSS actually pops the bottom blanks BD from the bottom strip stock to the anvil BAR, in conjunction with the vacuum in the latter.

Thereafter, the scrap material is fed around the stationary guide 204 and between the pinch roller 202, 205 which tend to pull the scrap material from the bottom blank severing apparatus.

The rotary die BRD includes five cutters CD positioned around the circumference thereof. Positioned adjacent the rotary die are two bearings 241, 242 which are engaged by cam followers 231, 232. The cam followers are positioned in a cam follower housing 234 which is engaged by jack screws 230S. The jack screws are threaded in the framework F of the bottom blank cutting apparatus and may be tightened to axially displace the cam follower housing 234 thereby exerting a force through the cam followers 231, 232 to the bearings 241, 242 to ensure proper die penetration of the bottom strip stock. As discussed hereinabove, the rotary die BRD and the cam follower housing 234 are slidably mounted on the framework F. Therefore, tightening or loosening the jack screws 230S actually displaces the cam follower housing 234 and the rotary die BRD with respect to the fixed anvil BAR.

The bottom blank BD is severed from the bottom strip stock BSS and transferred from the rotary die BRD to the anvil turret BAR. Vacuum is supplied to the anvil turret BAR to aid in the positioning of the bottom strip stock BSS on the anvil BAR and to aid in the transfer of the bottom blank BD and to retain the bottom blank on the circumferential surface of the anvil turret BAR through an arc of approximately 180°. An "O" ring OR is positioned adjacent to and concentric with the ends of each conduit 263C to effect a better seal and permit a more accurate transfer.

The bottom blanks BD are tangentially transferred from the anvil turret BAR to the second transfer turret BTT. At the point and time of tangential transfer the vacuum supplied to the conduits 263 is vented to the atmosphere by means of the openings 265A. The venting of the conduits 263C permits the transfer of the bottom blanks BD from the anvil to the second transfer turret where the bottom blanks are retained on substantially flat peripheral areas 280A by means of a vacuum supplied through conduits 280C. The bottom blanks BD are held on the circumferential surface of the second transfer turret BTT through an arc of approximately 180° by means of the vacuum supplied through the vacuum line 283, the manifold or distributor 282 and the conduits 280C. The vacuum supplied to the conduits 280C is terminated just prior to the tangential transfer of the bottom blanks BD from the second transfer turret BTT to the final forming mandrels FM. At the point and time of transfer of the bottom blank BD to the final forming mandrels FM the conduits 280C are vented to atmosphere to ensure the tangential transfer of the bottom blanks BD to the final forming mandrels FM by means of the vacuum present in the latter which thereafter retains the bottom blanks on the said mandrels.

Rotational power is supplied to the bottom blank severing apparatus through a gear reducer which is coupled to the axle 287. The gear 291 is keyed to the axle 287 and rotates therewith. Further, the gear 274 is keyed to the axle 260 and is in meshing engagement with the gear 291. Since the gear 274 is equal in size to the gear 291, the rotational speed of the anvil BAR is equal to the rotational speed of the second transfer turret BTT. However, since the anvil BAR is approximately one-half the size fo the second transfer turret BTT, the peripheral speed of anvil turret BAR is less then the peripheral speed of the second transfer turret BTT. This permits the narrow spacing requirements between the bottom blanks BD occasioned by the low scrap configuration of the rotary cutter BRD to be amplified to a compatible spacing with the bottom blank holding stations on the circumferential surface of the second transfer turret BTT. This ultimate spacing between the blanks BD and the peripheral velocity thereof on the circumferential surface of the second transfer turret BTT is selected to be completely compatible with the spacing between and transitory velocity of the final forming mandrels FM. Thus, the cut blanks BD are fed continuously and accurately from a closely spaced, low scrap condition at a first velocity to an increased spacing and second velocity compatible with the spacing and velocity of the transitory finishing mandrels.

The gear 270 is keyed to the axle 260 and is in meshing engagement with the gear 252. The size of the gear 252 and 270 are designed so that the rotational speed of the rotary die BRD is approximately twice the rotational speed of the anvil turret BAR and the second transfer turret BTT. As previously discussed, the rotary die BRD includes five cutter dies CD positioned around the circumference thereof while the anvil turret BAR has ten blank holding positions about its circumference. The diameter of the rotary die is approximately one-half the diameter of the anvil and approximately one-fourth the diameter of the second transfer turret, respectively. Therefore, since the rotational speed of the rotary die BRD is approximately twice the rotational speed of the anvil BAR the cutter dies CD align with the greater number of bottom blank positions spaced around the circumference of the anvil turret BAR and accurately and tangentially transfer a bottom blank from the rotary die to the anvil.

In summary, the bottom blank severing apparatus and method disclosed in the present invention continuously supplies a bottom strip stock to a rotary cutting die and effects a tangential transfer to a rotary anvil. Thereafter, the bottom blanks are tangentially transferred from the anvil to a second transfer turret. Subsequently, the bottom blanks are continuously tangentially transferred from the second transfer turret to a final forming mandrel FM which is supplied with vacuum to retain the bottom blanks thereon. The peripheral speed of the second transfer turret BTT and spacing of the holding positions thereon are correlated with the transitory speed and spacing, respectively, of the final forming mandrels FM which are positioned on a chain and are continuously moved past the transfer point for bottom blanks BD carried on the transfer turret BTT. The mandrels subsequently and continuously translate through a cylindrical blank transfer point, a bottom banger assembly, a shrink oven, and a bottom iron.

Thereafter, the finished containers on the mandrels FM are removed from the mandrels and may be processed through a top curl assembly and thence out through a discharge chute to complete the container making process.

It should be understood that the apparatus and method for providing bottom blanks for containers in a manufacturing process of the present invention may be modified as would occur to one of ordinary skill in the art without departing from the spirit and scope of the present invention.

We claim:

1. Apparatus for forming and transferring a series of bottom blanks from a severing station to individual transitory work stations at a velocity and spacing compatible with that of said work stations comprising:
    means located at said severing station for severing and translating bottom blanks of a desired shape from the surrounding selvage of a web of stock at a first spacing and velocity minimizing selvage remaining in the web;
    transfer means for receiving severed bottom blanks from said severing and translating means at an increased velocity and spacing compatible with that of said work stations, said transfer means including means for substantially instantaneous transfer of said bottom blanks from said means for severing and translating; and
    means coordinated with said work stations and said transfer means for transferring said severed bottom blanks from said transfer means onto respective ones of said work stations.

2. An apparatus according to claim 1, wherein said means for severing and translating bottom blanks comprises a die means cooperating with an adjacent anvil means and said web is continuously fed therebetween for continuously severing and translating said bottom blanks therefrom.

3. An apparatus according to claim 2, wherein said anvil means continuously supplies bottom blanks to said transfer means.

4. An apparatus according to claim 3, wherein said anvil means and said transfer means are rotary cylinders driven at substantially a one-to-one ratio and being of different diameters such that the velocity and spacing of said bottom blanks respectively increase at the time of transfer from said anvil means to said transfer means to a velocity and spacing compatible with said work stations.

5. The apparatus of claim 4 wherein said transfer means receives said severed bottom blanks from said means for severing by a substantially instantaneous transfer.

6. The apparatus of claim 5 wherein said rotary cylinders each include vacuum supply means for providing a controlled vacuum which facilitates the substantially instantaneous transfer between said means for severing and said transfer means.

7. An apparatus according to claim 2, wherein said die means is a rotary die including at least one cutting die positioned on the periphery thereof for severing bottom blanks from said web.

8. An apparatus according to claim 7, wherein said rotary die further includes compressed air supply means to eject bottom blanks from said cutting die to said anvil means.

9. An apparatus according to claim 2, wherein said anvil means is a cylindrical member rotatably mounted adjacent said die means.

10. An apparatus according to claim 9, wherein said anvil means includes a plurality of bottom blank positions spaced around the circumference thereof and vacuum supply means for applying a vacuum to said bottom blank positions to hold said bottom blanks thereon.

11. An apparatus according to claim 10, wherein said bottom blank positions spaced around the circumference of said anvil means include "O" rings adjacent to and concentric with said vacuum supply means.

12. An apparatus according to claim 10, wherein said vacuum supply means is connected to said bottom blank positions throughout a portion of the rotation of said anvil means to hold said web against said anvil means to ensure accurate severing and to effect a transfer to said transfer means.

13. An apparatus according to claim 10, wherein said vacuum supply means is vented to atmosphere at the point of transfer of said bottom blanks from said anvil means to said transfer means.

14. An apparatus according to claim 2, wherein said transfer means is a cylindrical member rotatably mounted adjacent said anvil means.

15. An apparatus according to claim 14, wherein said transfer means includes a second plurality of bottom blank positions spaced around the circumference thereof and second vacuum supply means for applying vacuum to said second bottom blank positions to hold said bottom blanks thereon.

16. An apparatus according to claim 15, wherein said vacuum supply means is connected to said second bottom blank positions throughout a portion of the rotation of said transfer means to effect a timed pick-up of bottom blanks from said anvil means and subsequently release thereof onto respective ones of said work stations.

17. An apparatus according to claim 15, wherein said second vacuum supply means is vented to atmosphere at the point of transfer of said bottom blanks onto respective ones of said work stations.

18. An apparatus according to claim 2, wherein the die means, anvil means and transfer means are cylindrical and mounted for rotation.

19. An apparatus according to claim 18, wherein the die means rotates at twice the rotational speed of the anvil means and the transfer turret means.

20. An apparatus according to claim 18, wherein said anvil means and said die means are driven at substantially a one-to-two ratio and being of different diameters such that said bottom blanks are severed from said web with a minimum amount of scrap remaining in said web.

21. An apparatus according to claim 2, wherein said bottom blanks are tangentially received by said transfer means from said anvil means.

22. An apparatus according to claim 1, wherein bottom blanks are tangentially received by said respective ones of said work stations from said transfer means.

23. An apparatus according to claim 1, wherein said work stations are final forming mandrels which include, respectively, additional vacuum supply means for holding bottom blanks thereon.

24. An apparatus according to claim 2, wherein said die means is mounted in an adjustable means for accurately positioning said die means relative to said anvil means.

25. An apparatus according to claim 24, wherein said adjustable means comprises a slidable housing mounted on a framework and a cam housing mounted adjacent thereto for accurately positioning said die means relative to said anvil means.

26. An apparatus according to claim 25, wherein said cam housing means includes at least one cam follower rotatably mounted therein and a means for displacing said cam housing thereby displacing said die means for accurately positioning said die means relative to said anvil means.

27. An apparatus according to claim 25, wherein said means for displacing said cam housing comprises at least one jack screw threaded within an opening in said framework.

28. An apparatus according to claim 2, wherein said web is fed between a pair of pinch rollers and around a stationary guide and into engagement with said anvil means before passing between said die means and said anvil means.

29. An apparatus according to claim 2, wherein said anvil means and said transfer means are cylindrical turrets mounted for rotation adjacent each other.

30. The apparatus of claim 1 further comprising: means for discharging said selvage from said means for severing in a continuous selvage strip.

31. Apparatus for forming and transferring a series of bottom blanks from a severing station to individual transitory work stations at a velocity and spacing compatible with that of said work stations comprising:
rotary die means cooperating with a rotary anvil turret means located at said severing station for continuously severing and translating bottom blanks from the surrounding selvage of a web of stock continuously fed therebetween at a first spacing and velocity minimizing the selvage remaining in said web;
rotary transfer turret means for receiving severed bottom blanks from said rotary anvil turret means at an increased velocity and spacing compatible with that of said work stations, said rotary transfer and turret means including means for substantially instantaneous tangental transfer of said bottom blanks from said rotary anvil turret means; and
means coordinated with said stations and said rotary turret means for transferring said severed bottom blanks from said rotary transfer means onto respective ones of said work stations.

32. An apparatus according to claim 31, wherein said rotary anvil turret means and said rotary transfer turret means are driven at substantially a one-to-one ratio and being of different diameters such that the velocity and spacing of said bottom blanks respectively increase at the time of transfer from said rotary turret means to said rotary transfer turret means to a velocity and spacing compatible with said work stations.

33. An apparatus according to claim 31, wherein said rotary die means further includes a cutting die positioned on the periphery thereof and a compressed air supply means to eject said bottom blanks from said cutting die.

34. An apparatus according to claim 31, wherein said rotary anvil turret means is cylindrical and includes a plurality of bottom blank positions spaced around the circumference thereof and vacuum supply means for applying vacuum to said bottom blank positions to hold said bottom blanks thereon.

35. An apparatus according to claim 34, wherein said vacuum supply means is connected to said bottom blank positions throughout a portion of the rotation of said rotary anvil turret means to hold said web adjacent to said rotary anvil turret means to ensure accurate severing of said bottom blanks and to effect a transfer to said rotary transfer turret means.

36. An apparatus according to claim 34, wherein said vacuum supply means of said rotary anvil turret means is vented to atmosphere at the point of transfer of said bottom blanks from said rotary anvil turret means to said rotary transfer turret means.

37. An apparatus according to claim 31, wherein said rotary transfer turret means is cylindrical and includes a plurality of bottom blank positions spaced around the circumference thereof and vacuum supply means for applying vacuum to said bottom blank positions to hold said bottom blanks thereon.

38. An apparatus according to claim 37, wherein said vacuum supply means is connected to said bottom blank positions throughout a portion of the rotation of said rotary transfer turret means to effect a timed pick-up of bottom blanks from said rotary anvil turret means and subsequent release thereof onto respective ones of said work stations.

39. An apparatus according to claim 37, wherein said vacuum supply means of said rotary transfer turret means is vented to atmosphere at the point of transfer of said bottom blanks onto respective ones of said work stations.

40. An apparatus according to claim 34, 35, 36, 37, 38 or 39 wherein said rotary die means further includes a cutting die positioned on the periphery thereof and a compressed air supply means to eject said bottom blanks from said cutting die.

41. An apparatus according to claim 34, 35 or 36, wherein said rotary transfer turret means is cylindrical and includes a plurality of bottom blank positions spaced around the circumference thereof and vacuum supply means for applying vacuum to said bottom blank positions to hold said bottom blanks thereon.

42. An apparatus according to claim 34, 35 or 36 wherein said vacuum supply means is connected to said bottom blank positions throughout a portion of the rotation of said rotary transfer turret means to effect a timed pick-up of bottom blanks from said rotary anvil turret means and subsequent release thereof onto respective ones of said work stations.

43. An apparatus according to claim 34, 35 or 36 wherein said vacuum supply means of said rotary transfer turret means is vented to atmosphere at the point of transfer of said bottom blanks onto respective ones of said work stations.

44. An apparatus according to claim 34, wherein an "O" ring is positioned adjacent to and concentric with each of said vacuum supply means for applying vacuum to said bottom blank positions.

45. An apparatus according to claim 37, wherein an "O" ring is positioned adjacent to and concentric with each of said vacuum supply means for applying vacuum to said bottom blank positions.

46. The apparatus of claim 31 further comprising:
means for discharging said selvage from said means for severing in a continuous selvage strip.

47. The apparatus of claim 31 wherein said rotary transfer turret receives said bottom blanks from said rotary anvil turret through a substantially instantaneous transfer between said turrets.

48. The apparatus of claim 47 wherein said rotary transfer turret and rotary anvil turret each include vacuum supply means for providing a controlled vacuum which facilitates the substantially instantaneous tangental transfer between said means for severing and said transfer means.

49. Apparatus for forming and transferring a series of bottom blanks from a severing station at a velocity and spacing compatible with that of said work stations comprising:
rotary die means cooperating with a rotary anvil turret located at said severing station for continuously severing and translating bottom blanks from the surrounding selvage of a web of stock continuously fed therebetween at a first spacing and velocity minimizing the selvage remaining in said web, said severed bottom blanks being positively indexed on said rotary anvil turret means;
means for discharging said selvage from said means for severing in a continuous selvage strip;
rotary transfer turret means for positively transferring said severed bottom blanks from said rotary anvil turret means to said rotary transfer turret means in a substantially instantaneous manner, said rotary transfer turret means rotating at an increased velocity and spacing compatible with that of said work stations, said severed bottom blanks being positively indexed thereon; and
means coordinated with said stations and said rotary turret means for transferring said severed bottom blanks from said rotary transfer means onto respective ones of said work stations.

* * * * *